(12) United States Patent
Haimer

(10) Patent No.: US 11,554,422 B2
(45) Date of Patent: *Jan. 17, 2023

(54) TOOL HOLDER WITH BUILT-IN CAVITIES

(71) Applicant: Franz Haimer Maschinenbau KG, Hollenbach-Igenhausen (DE)

(72) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,304

(22) Filed: Sep. 24, 2019

(65) Prior Publication Data

US 2020/0016665 A1 Jan. 16, 2020

Related U.S. Application Data

(63) Continuation of application No. 14/654,662, filed as application No. PCT/EP2013/077782 on Dec. 20, 2013, now Pat. No. 10,442,008.

(30) Foreign Application Priority Data

Dec. 21, 2012 (DE) .......................... 102012025075.4
Mar. 27, 2013 (DE) .......................... 102013103168.4

(51) Int. Cl.
*B23B 31/117* (2006.01)
*B23B 31/30* (2006.01)
(Continued)

(52) U.S. Cl.
CPC .............. *B23B 31/305* (2013.01); *B22F 5/10* (2013.01); *B22F 7/08* (2013.01); *B23B 31/02* (2013.01);
(Continued)

(58) Field of Classification Search
CPC ............... B23B 2250/16; B23B 31/117; B23B 31/1179; B23B 31/305; B23B 31/1177;
(Continued)

(56) References Cited

U.S. PATENT DOCUMENTS 5,067,861 A * 11/1991 Danielsen ............. B23B 31/305
279/4.03
6,260,858 B1 7/2001 DeLucia
(Continued)

FOREIGN PATENT DOCUMENTS

CN 201108970 Y 9/2008
DE 19629610 A1 * 1/1998 ....... B23B 29/03417
(Continued)

OTHER PUBLICATIONS

Machine Translation, DE19629610A1, Zeiner, J., Jan. 29, 1998. (Year: 1998).*

*Primary Examiner* — Chwen-Wei Su

(57) ABSTRACT

A tool holder having a main body for coupling the tool holder to the spindle of a machine tool and having a clamping surface connected thereto for clamping a tool, characterized in that the tool holder has at least one portion shaped in one piece by primary shaping, which in its interior has one or more cavities that form an enclave in the portion shaped by primary shaping.

18 Claims, 21 Drawing Sheets

(51) Int. Cl.
*B23B 31/20* (2006.01)
*B23B 31/02* (2006.01)
*B23B 31/11* (2006.01)
*B23C 5/26* (2006.01)
*B22F 5/10* (2006.01)
*B22F 7/08* (2006.01)

(52) U.S. Cl.
CPC .......... *B23B 31/11* (2013.01); *B23B 31/1177* (2013.01); *B23B 31/1178* (2013.01); *B23B 31/1179* (2013.01); *B23B 31/202* (2013.01); *B23B 31/20125* (2021.01); *B23C 5/26* (2013.01); *B23B 2250/12* (2013.01); *B23B 2250/16* (2013.01); *B23B 2265/326* (2013.01); *Y02P 10/25* (2015.11); *Y10T 279/1216* (2015.01); *Y10T 279/17931* (2015.01); *Y10T 279/17957* (2015.01); *Y10T 407/1946* (2015.01)

(58) Field of Classification Search
CPC . B23B 31/1178; B23B 2228/21; B23B 31/02; B23B 31/202; B23B 31/11; B23B 31/201; B23B 2250/12; B23B 2265/326; B23C 5/26; B22F 3/1055; B22F 5/10; B22F 7/08; Y10T 408/76; Y10T 409/304312; Y10T 409/304032; Y10T 279/17957; Y10T 279/1241; Y10T 279/1216; Y10T 279/17931; Y10T 407/1946
See application file for complete search history.

(56) References Cited

U.S. PATENT DOCUMENTS

| | | | |
|---|---|---|---|
| 6,749,376 B2 | 6/2004 | Keefe et al. | |
| 6,938,903 B1 | 9/2005 | Haimer | |
| 7,131,797 B2 | 11/2006 | Kai et al. | |
| 7,217,072 B1 | 5/2007 | Haimer | |
| 9,016,988 B2 | 4/2015 | Sakamaki et al. | |
| 9,180,525 B2 | 11/2015 | Park et al. | |
| 9,676,039 B2 | 6/2017 | Doi | |
| 2003/0057662 A1 | 3/2003 | Miya et al. | |
| 2004/0052598 A1 | 3/2004 | Haimer | |
| 2004/0149738 A1 | 8/2004 | Haimer | |
| 2005/0184472 A1* | 8/2005 | Huijbers | B23B 31/305 279/4.01 |
| 2005/0275170 A1* | 12/2005 | Haenle | B23D 23/00 279/20 |
| 2007/0187393 A1 | 8/2007 | Haimer | |
| 2007/0257413 A1 | 11/2007 | Retzbach et al. | |
| 2009/0179368 A1 | 7/2009 | Haimer | |
| 2011/0156363 A1 | 6/2011 | Haimer | |
| 2011/0175300 A1 | 7/2011 | Schuffenhauer et al. | |
| 2011/0266756 A1 | 11/2011 | Haimer | |
| 2015/0367423 A1 | 12/2015 | Voss | |

FOREIGN PATENT DOCUMENTS

| | | | |
|---|---|---|---|
| DE | 19928995 A1 | 12/2000 | |
| DE | 19926209 C1 | 2/2001 | |
| DE | 10131480 A1 | 1/2002 | |
| DE | 10340052 A1 | 5/2005 | |
| DE | 102008060374 A1 | 3/2010 | |
| EP | 0074332 A2 | 3/1983 | |
| EP | 1353768 B1 | 5/2005 | |
| EP | 1669147 A1 | 6/2006 | |
| EP | 2174736 A1 * | 4/2010 | ........... B23B 31/305 |
| JP | 10029106 A * | 2/1998 | |
| JP | 3196169 B2 | 8/2001 | |
| JP | 2003522650 A | 7/2003 | |
| JP | 6450684 B2 | 1/2016 | |
| WO | 0076703 A1 | 12/2000 | |
| WO | 02051571 A1 | 7/2002 | |
| WO | 2005102595 A1 | 11/2005 | |

* cited by examiner

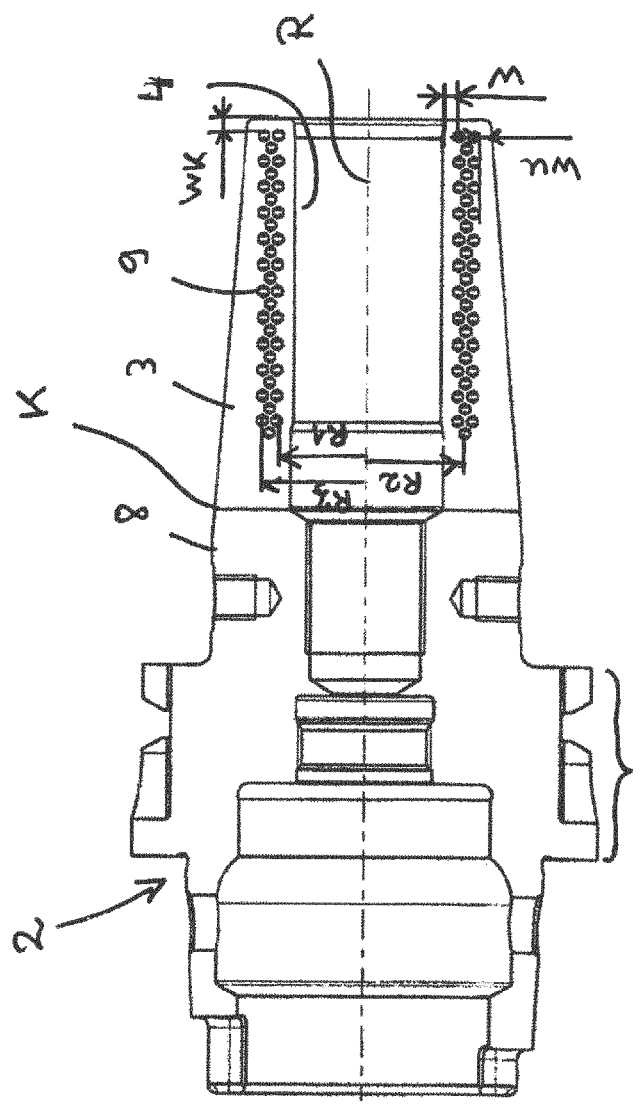
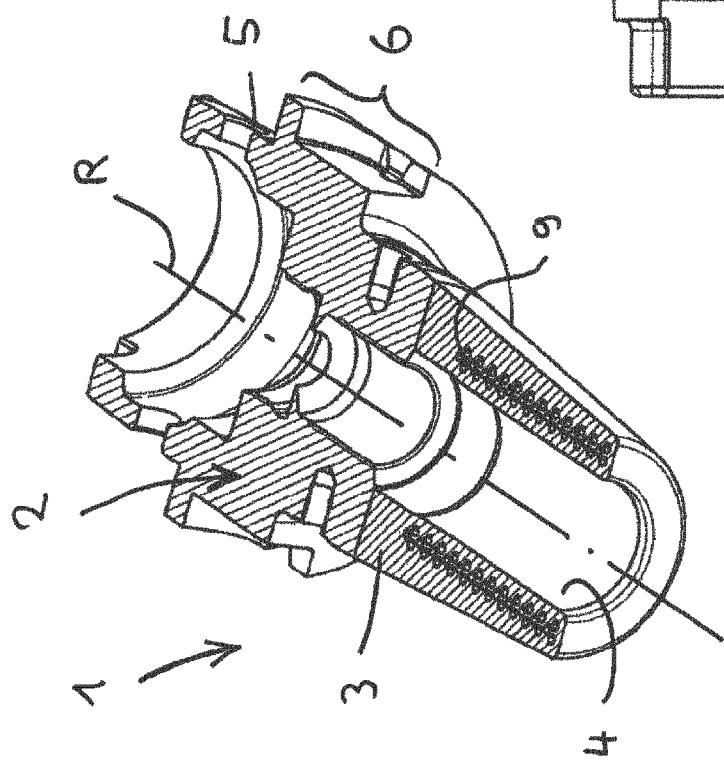
Fig. 1
Fig. 2

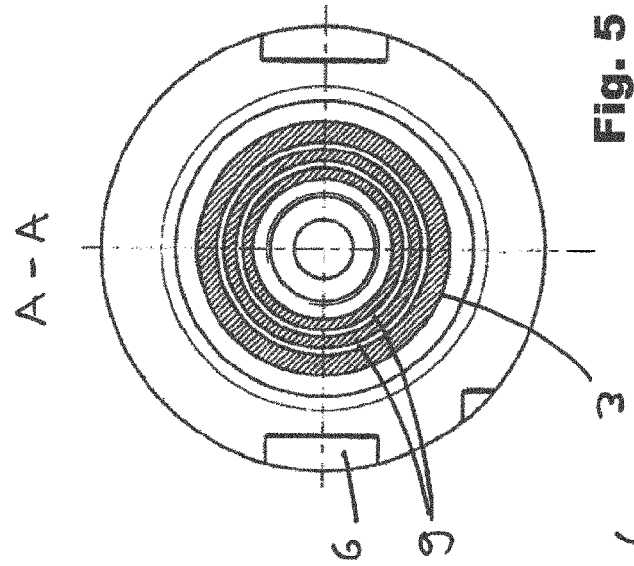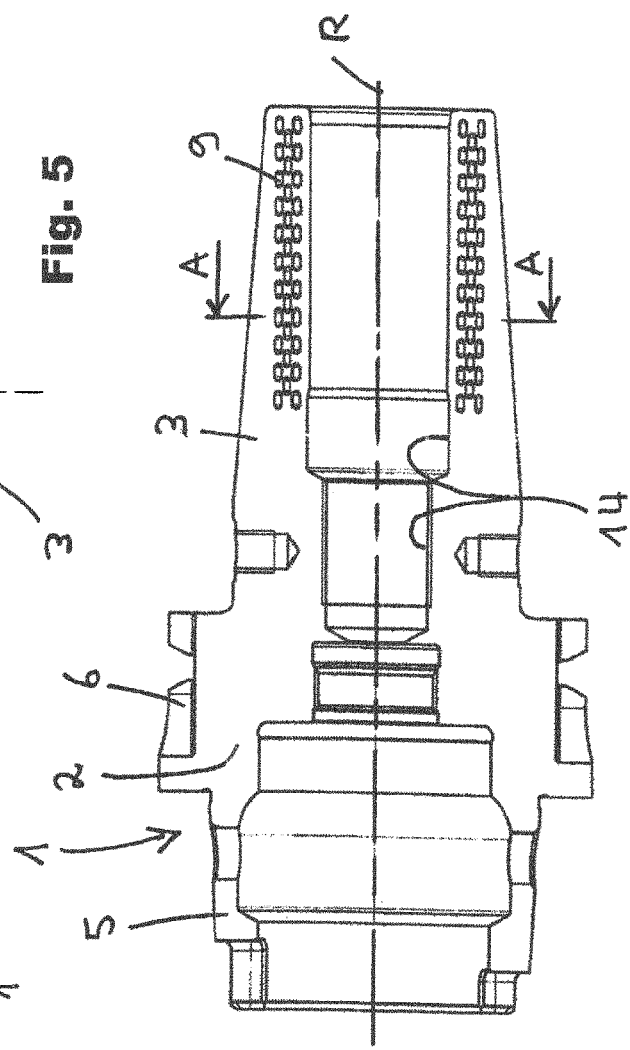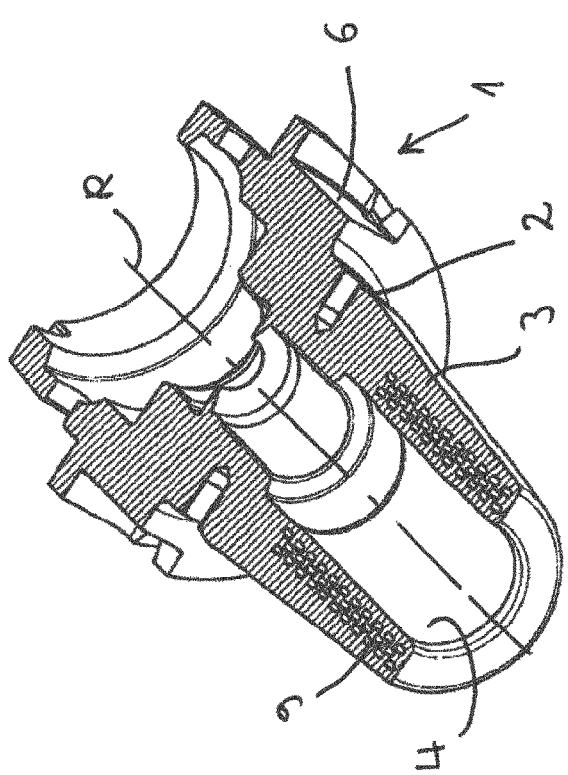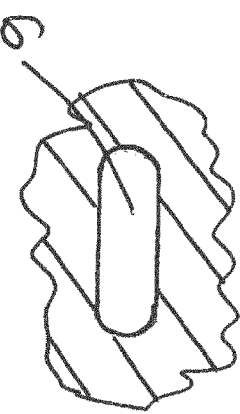

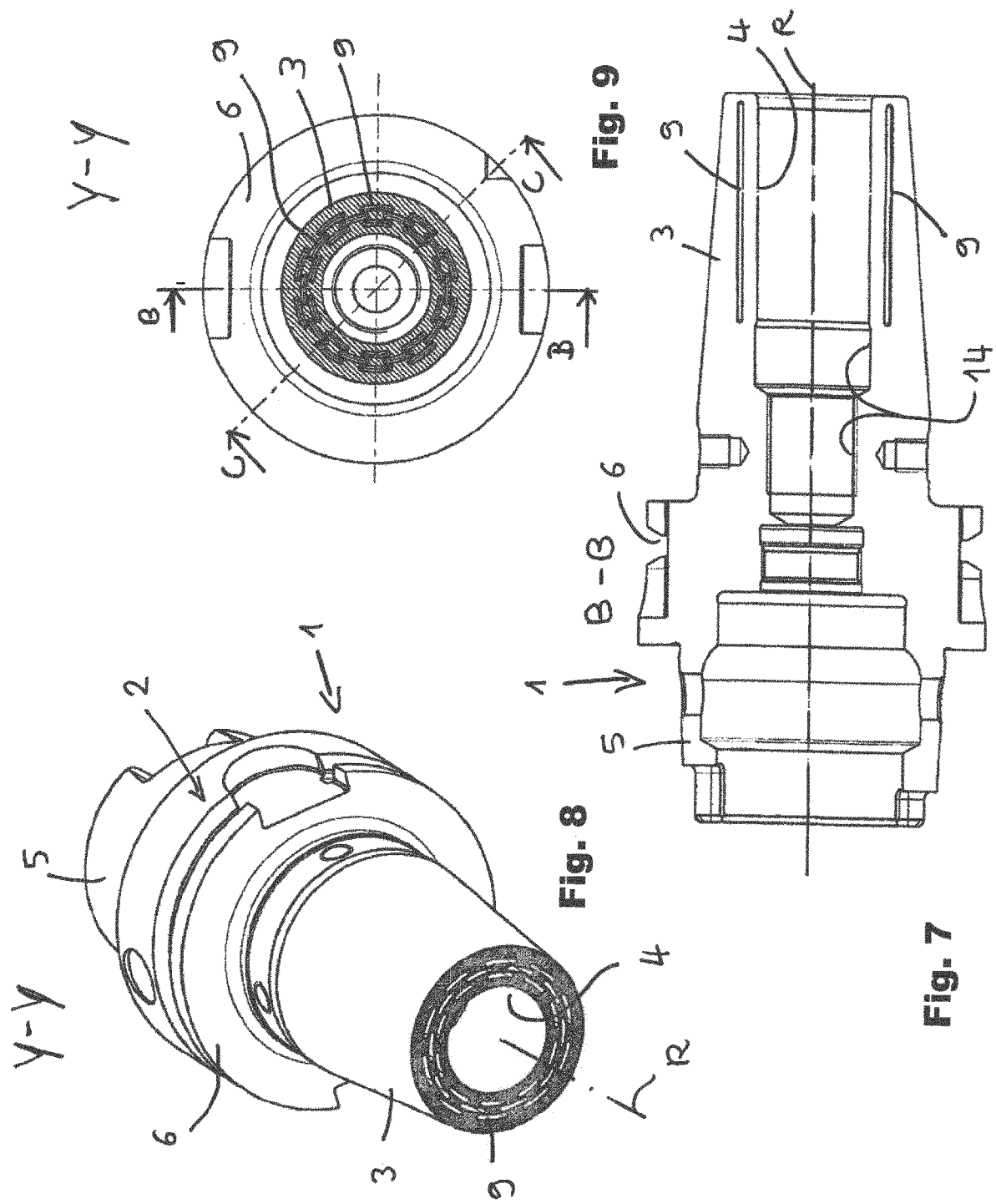

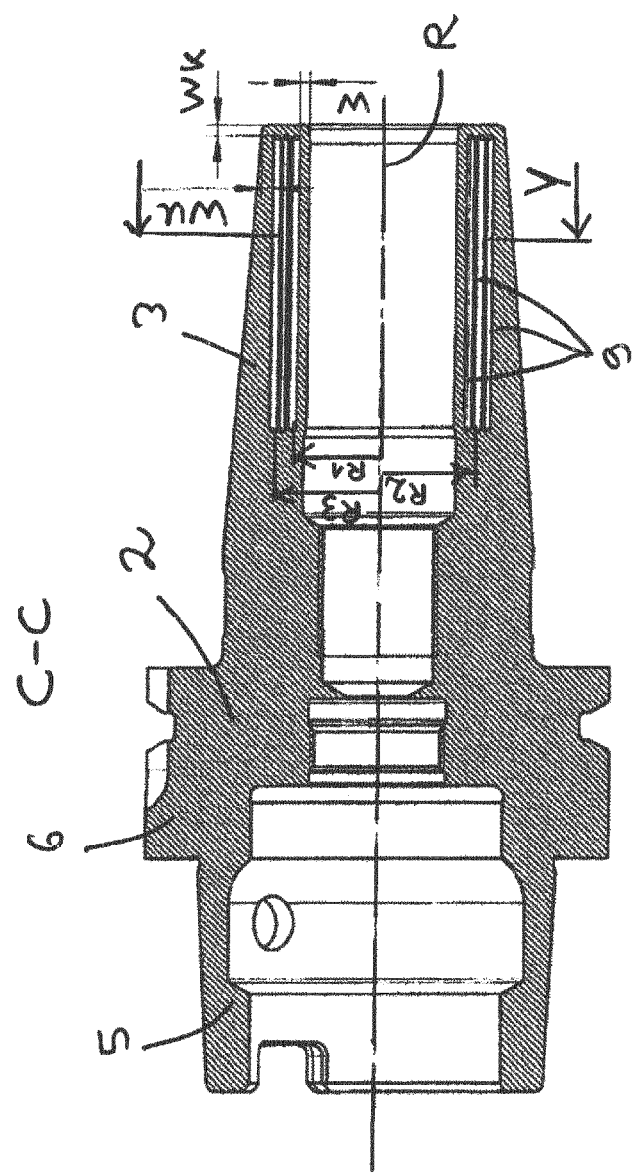

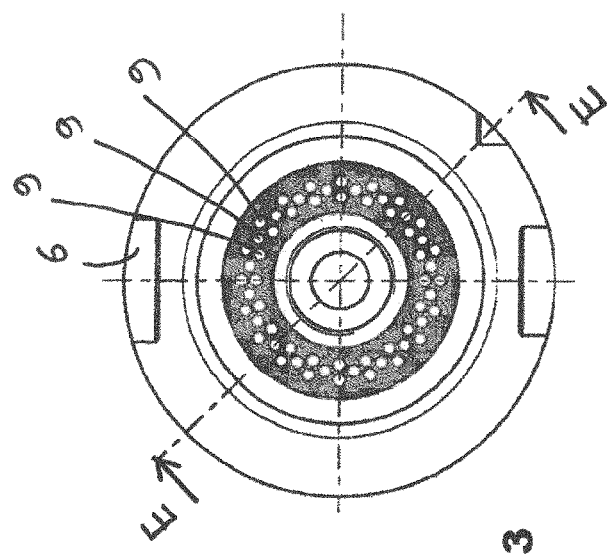
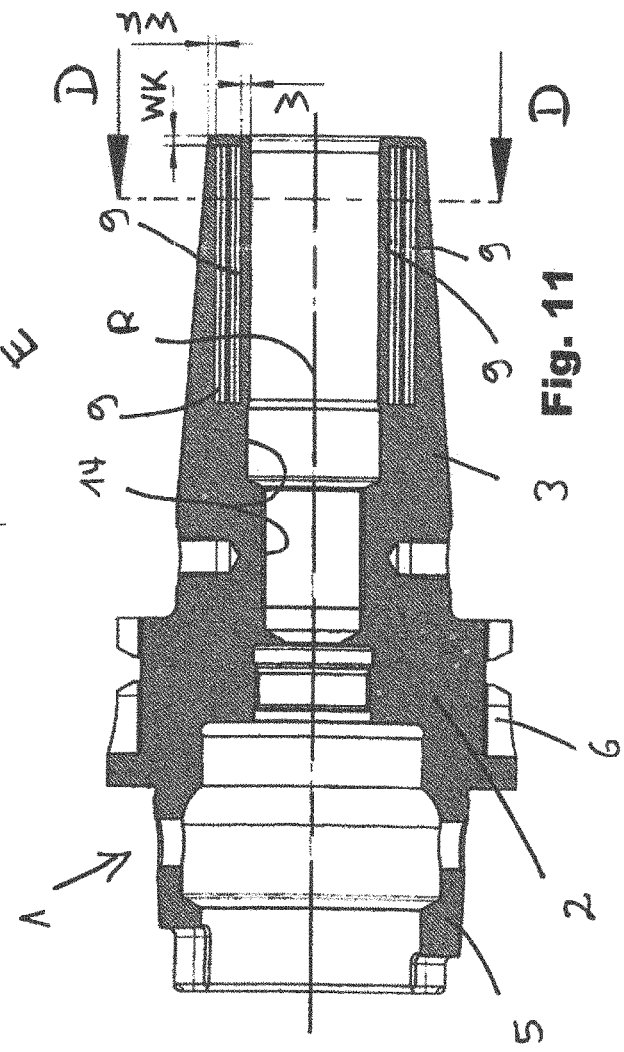
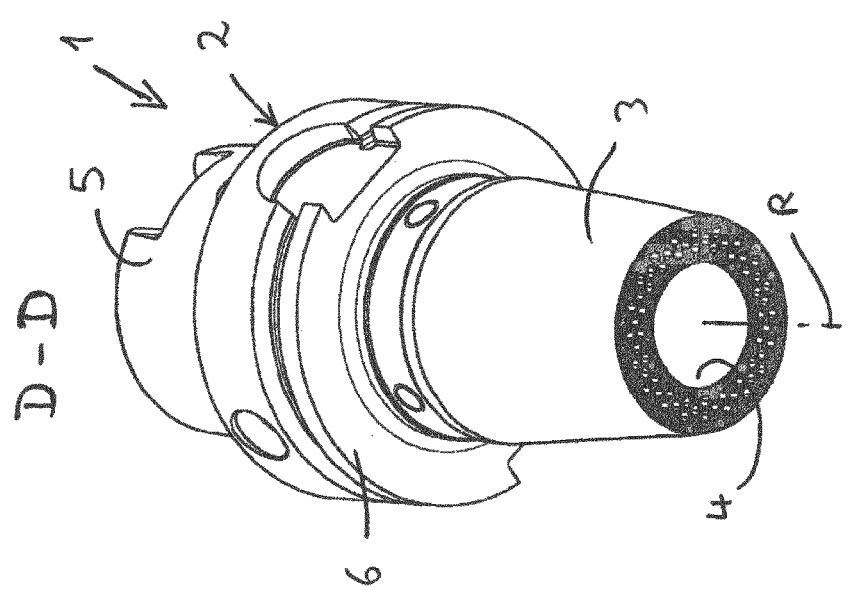

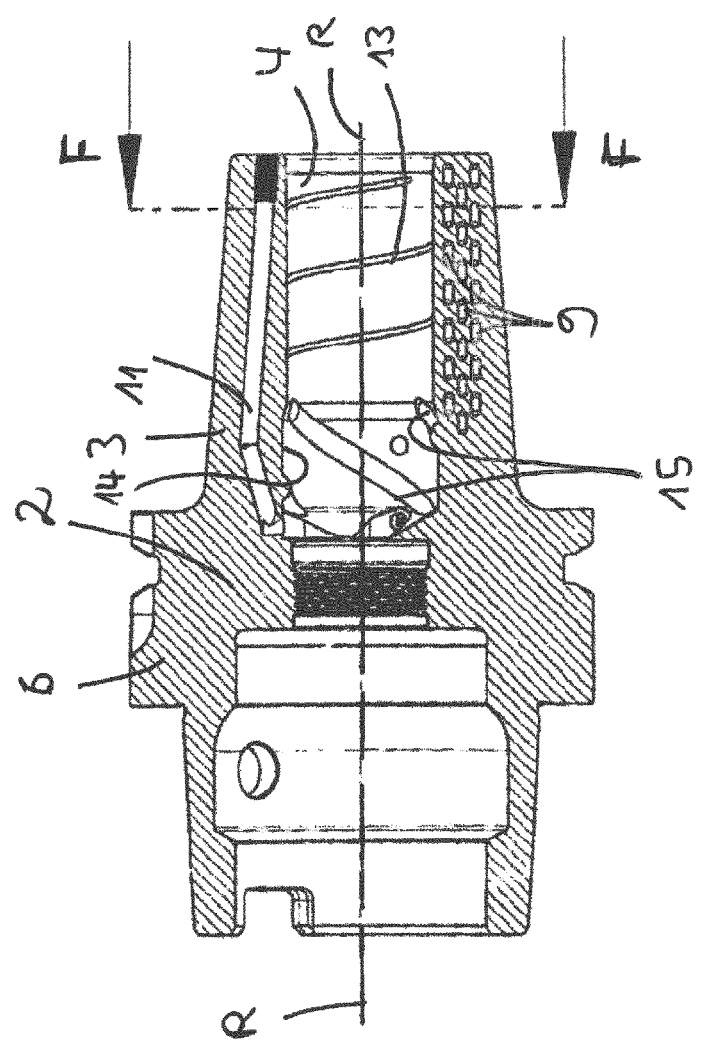

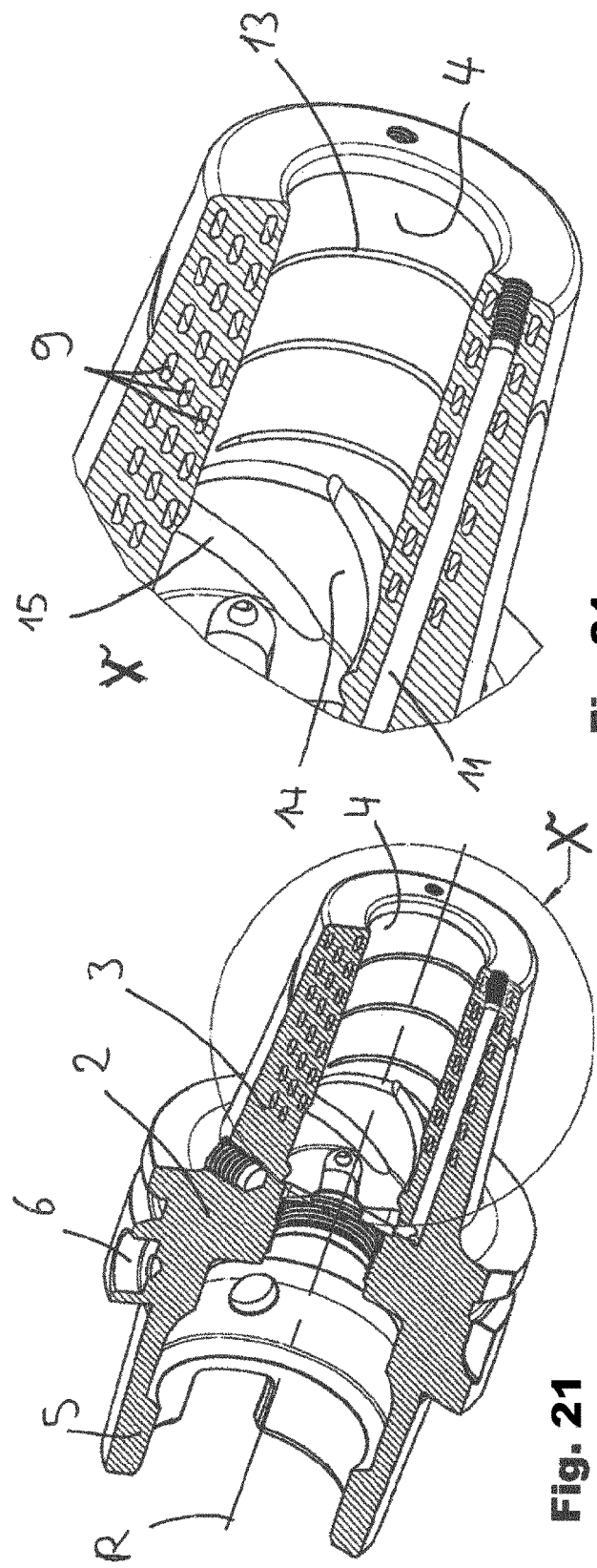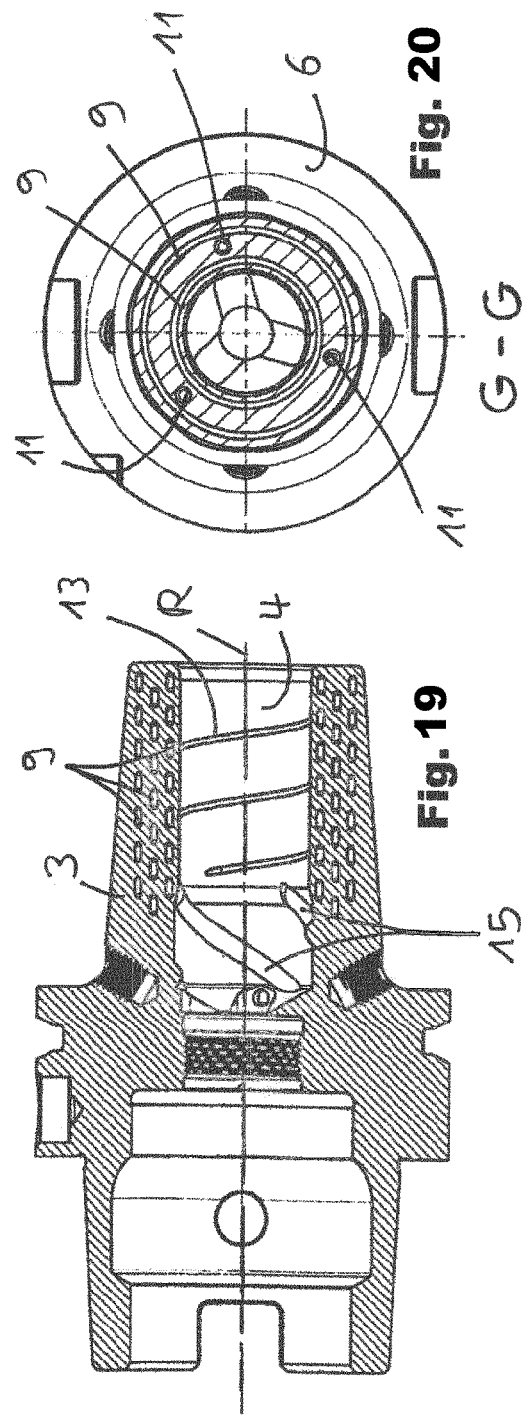

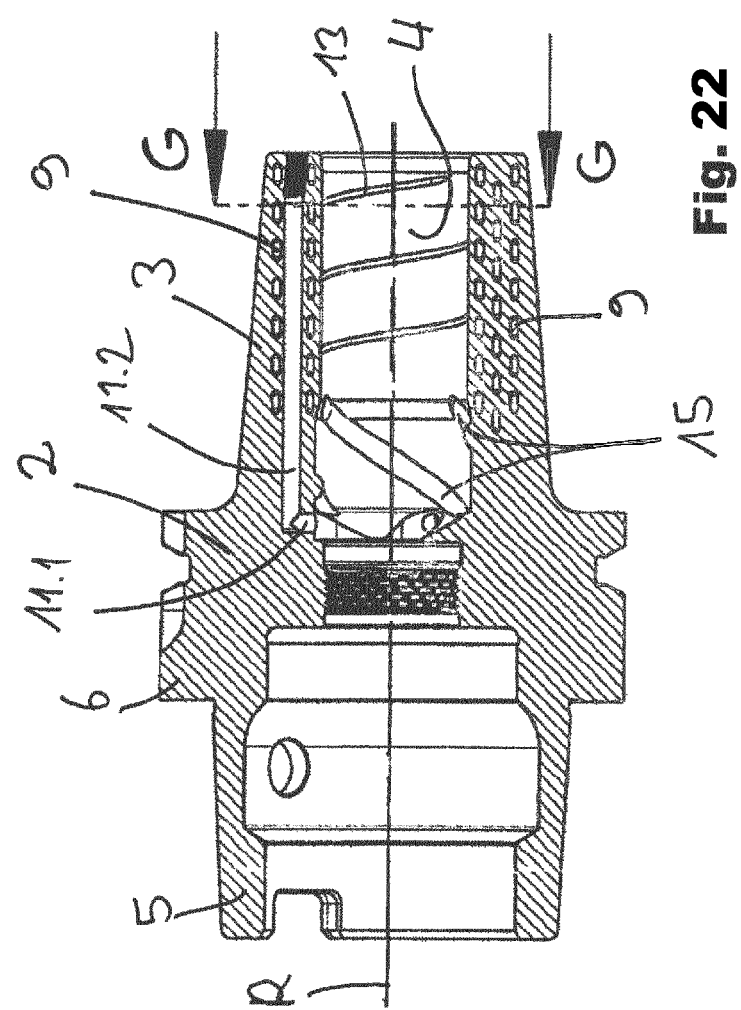

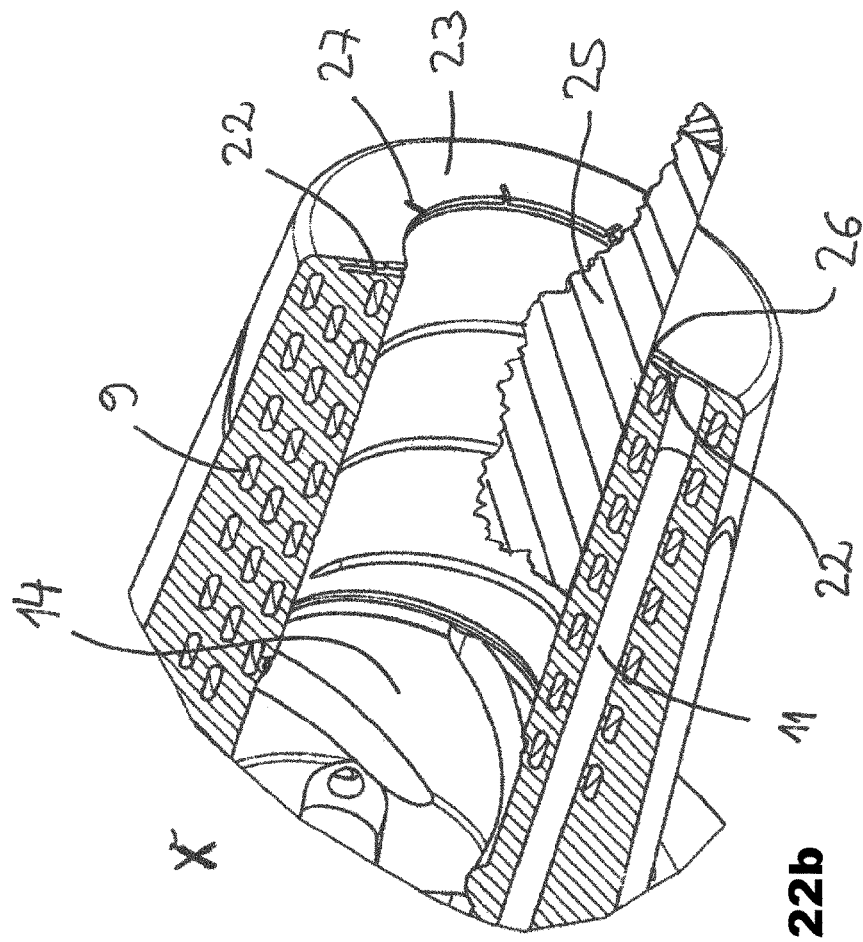
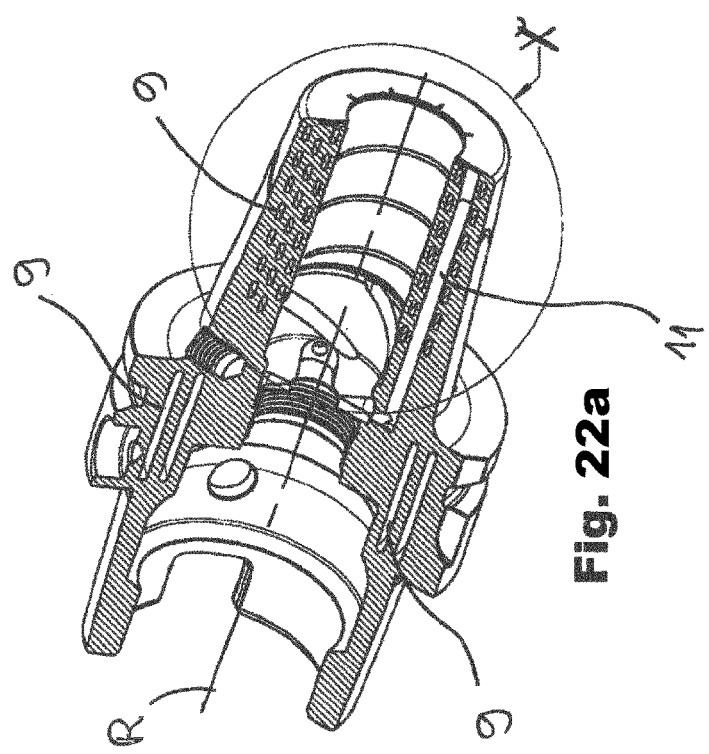

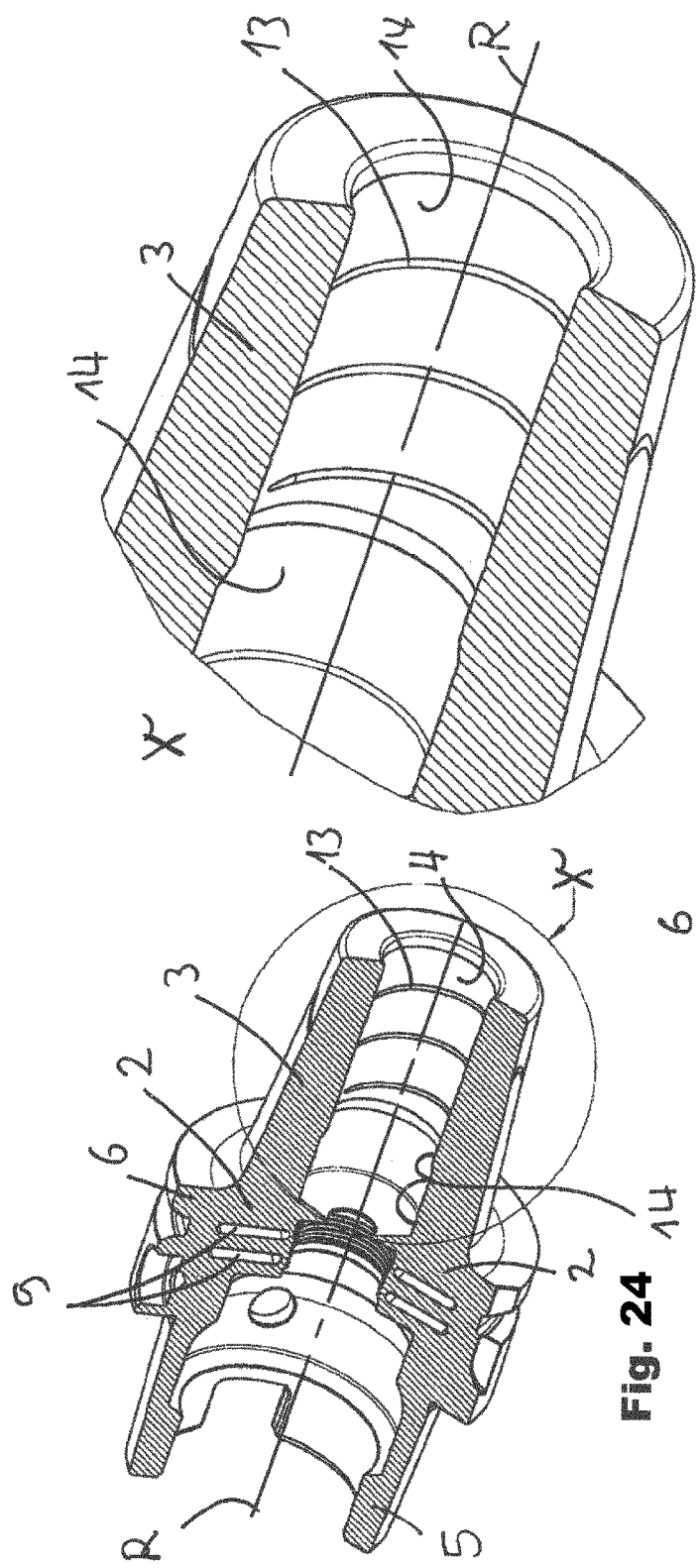
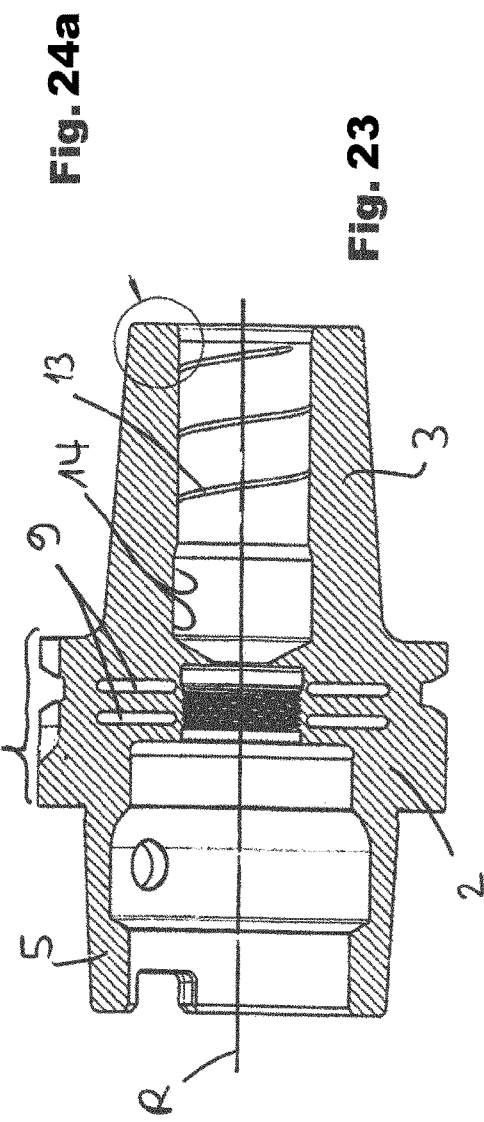

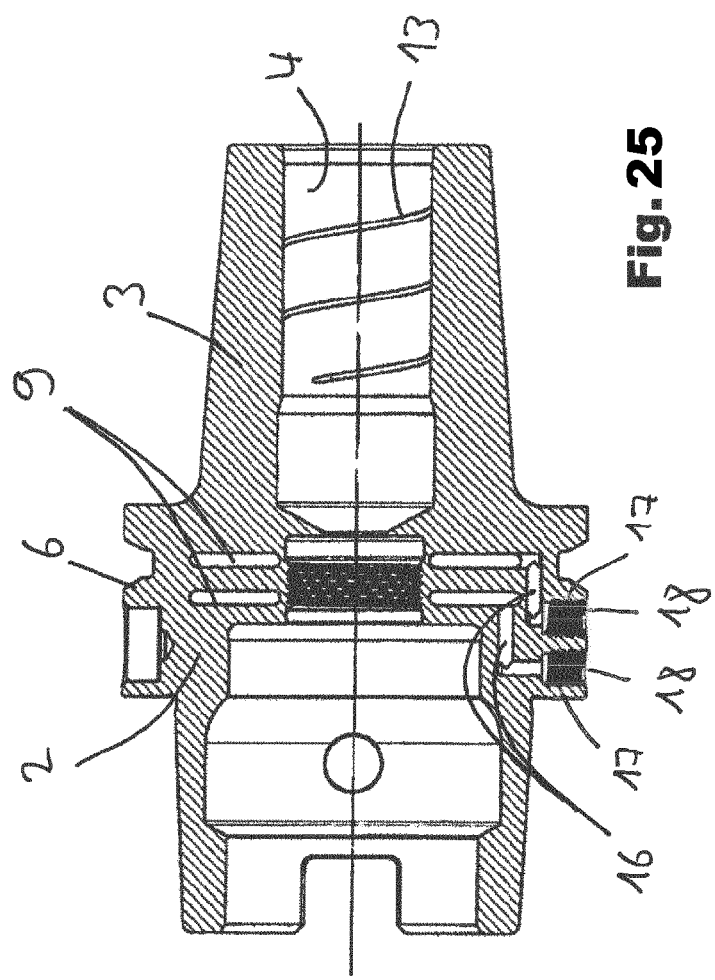

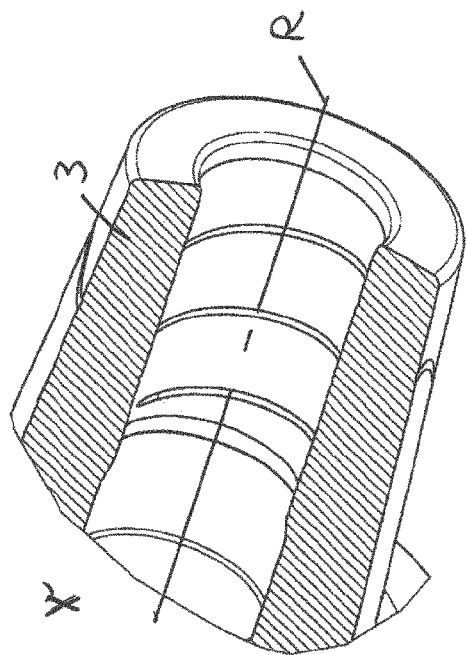
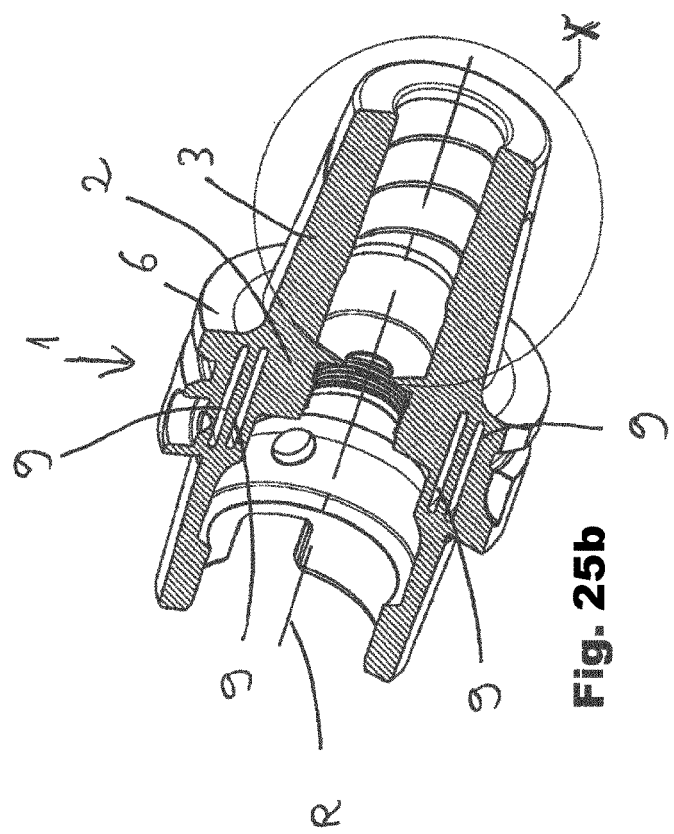
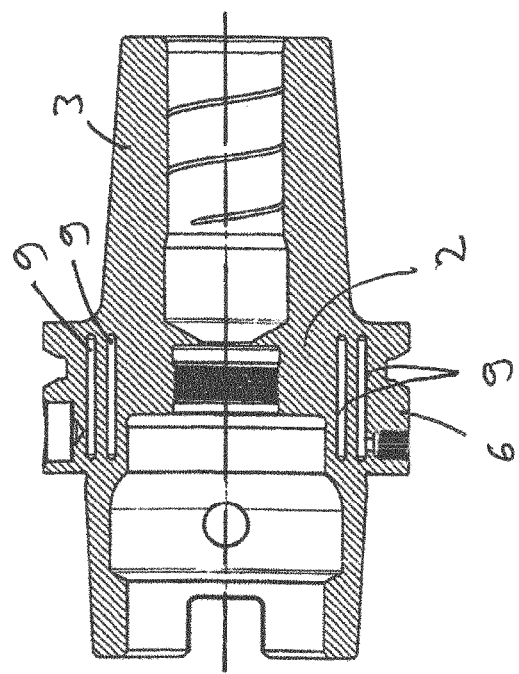
Fig. 25a
Fig. 25b
Fig. 25c

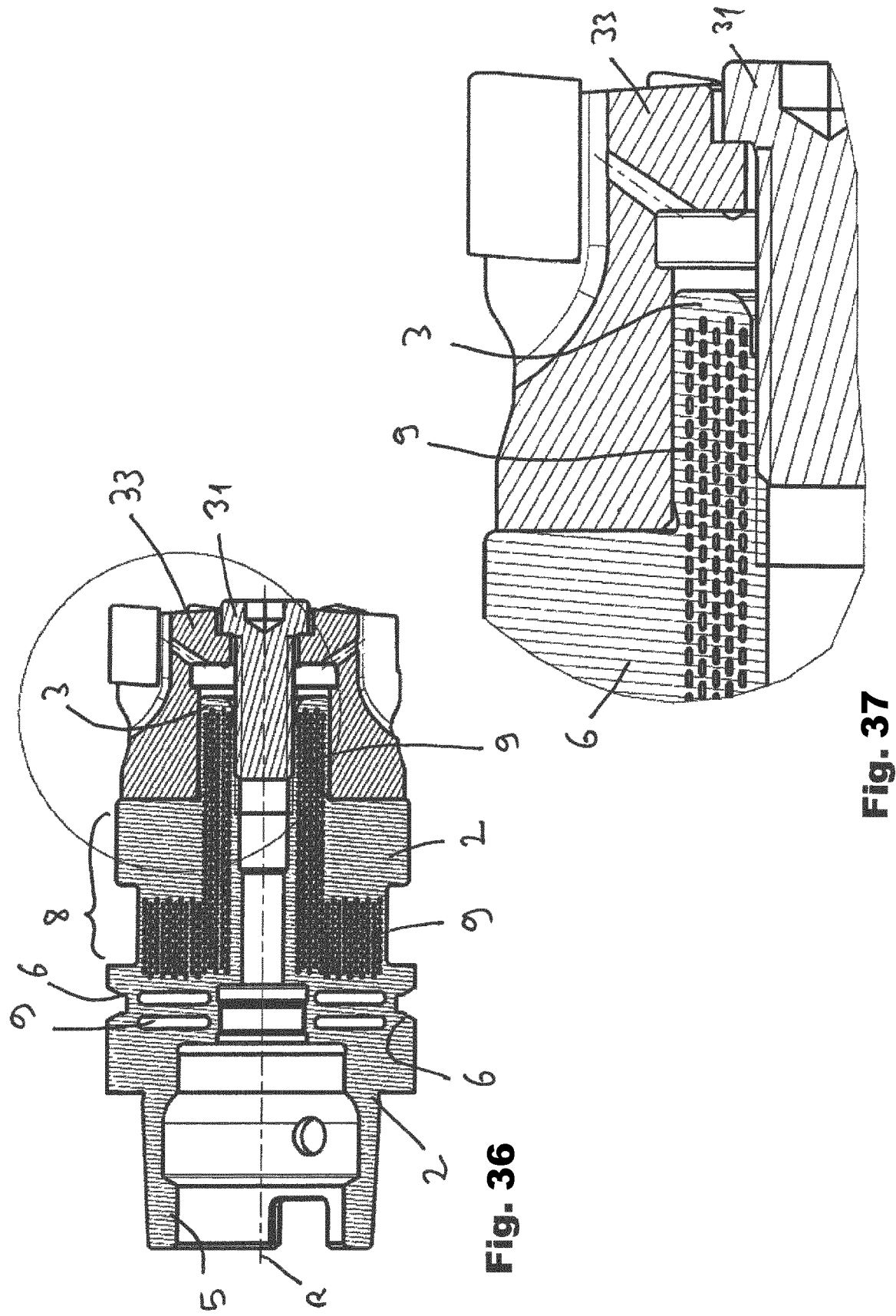

TOOL HOLDER WITH BUILT-IN CAVITIES

FIELD OF THE INVENTION

The invention relates to a tool holder for a tool, in particular in the form of a drill, milling cutter or friction tool or cutter head, that is rotatable about an axis of rotation.

BACKGROUND OF THE INVENTION

It is known for the shaft of such a tool to be held in a central receiving opening of an annular, self-contained part, most often embodied as a tube part, of a tool holder by means of a press fit. This tube part forms the end toward the tool of a tool holder of otherwise conventional design.

This tube part of the tool holder can be widened by heating so far in the radial direction that the cold shaft of the tool can be thrust into the tube part or pulled out of it. As soon as the tube part has cooled down again, a pressure bond between it and the shaft of the tool, by means of which pressure bond the tool is reliably fixed in the tool holder shrink-fit technology; see for example EP 1 353 768 B1).

Alternatively, chucking can also be done hydraulically. For that purpose, inside the aforementioned tube part of the tool holder, a hydraulic clamping device is provided, which upon imposition of hydraulic pressure reduces its inside diameter embracing the tool shaft and thus chucks the tool shaft by frictional engagement.

So-called collet chucks are a further alternative; in them, the tool shaft is kept clamped by frictional engagement with the aid of a collet, by driving the collet, which is provided with an outer cone, into a complementary conical seat and thereby causing it to close.

It is also known for tools in the form of so-called cutter heads to be connected by positive engagement, with the aid of a usually central set screw and one or preferably more drivers to the tool holder, which here is usually called a cutter head receptacle.

Collet chucks of the type described have proved themselves very well in practice.

In general in collet chucks of the described type, there is the problem that under unfavorable circumstances, because of reaction forces that originate at the cutting edges of the tool, vibration is induced, which not infrequently is in or near the resonant range. Such vibration arises because the tool cutting edges are exposed to rapidly alternating stresses, for instance because in rapid succession, n and n+1 cutting edges mesh with one another in alternation. This vibration can make itself felt so markedly in the complete system comprising the tool, collet chuck and machine tool, that the cutting speed, for instance, and/or other cutting parameters have to be reduced, which impairs the performance of the concrete system and is therefore unwanted.

It is known that the tendency to vibration of such a complete system can be favorably affected in some cases by "softer" chucking of the tool.

It is the object of the present invention to disclose a means which makes chucking the tool in a way that especially favorably affects the vibration behavior of the tool, without making compromises in the machining precision.

SUMMARY OF THE INVENTION

This object is attained by a tool holder for chucking a tool. The tool holder has a main body for coupling the tool holder to the spindle of a machine tool and a clamping portion, preferably connected to it in single-substance fashion or at least in one piece, for clamping a tool shaft or a cutter head. In practice, the clamping portion is often embodied as a tube part, which in turn is embodied such that the tool shaft can be fixed thermally or hydraulically in the tube part. Ideally, such a tube part is embodied such that the tool shaft can be shrink-fitted into the tool receptacle furnished by it; that is, the tool receptacle, which in the cold state is undersized compared to the outer diameter of the tool shaft, can be widened so far by the application of heat that the cold tool shaft can be inserted and is held in a manner fixed against relative rotation, at least predominantly, by the press fit ensuing as the tube part cools down again.

Regardless of how the clamping portion is embodied, it is provided according to the invention that a tool holder has at least one portion shaped in one piece by primary shaping, which has one or more cavities that are located entirely in the interior of that portion and that form an enclave in the portion shaped by primary shaping. The term "enclave" is understood to mean a structure that is completely self-contained relative to its surroundings and in particular toward the outside. A lid, stopper or the like screwed on or in or fixed by welding is not needed.

Surprisingly, it has been found that a cavity that is embodied as completely self-contained and completely inside a portion shaped by primary shaping has excellent damping properties. This positive effect is multiplied if a plurality of cavities is provided.

Moreover, the cavities embodied according to the invention offer the possibility of so-called "constructive balancing", thus eliminating the necessity of touching the surface of the tool holder in order to make one or more bores have in the surface of the tool holder for the sake of balancing. This is because such bores often interfere with the handling and use of the tool. Precisely in tool holders in the form of shrink-fit collets, such ores are often problematic because cooing lubricant and/or coolant fluid can accumulate in them and are not easily blown out of the bore if the tool holder, after being shrink-fitted on or after the shrink fit is undone, is to be showered with water for the sake of rapid cooling and then blown dry extremely quickly with a focused stream of air.

It must be noted that voids, microscopic pores or other flaws that occur at random and undefined places in the microstructure of the material are not cavities in the sense of the invention. Preferably, in the sense of the invention a cavity is exclusively a construction that has a defined geometric form embodied in accordance with a rule determined in advance and ideally has a radial length and a length in the direction of the axis of rotation of the tool holder that is greater than $\frac{1}{10}$ of a millimeter and preferably even greater than 1 mm. It is especially preferable to lend the same design to a plurality of cavities, aside from unavoidable production tolerances.

According to the invention, it is provided that a plurality of cavities are located such that they are located on at least two, and even better three, coaxial imaginary cylindrical or conical jackets one inside the other.

Within the context of an advantageous further development, it is provided that the cavities in the circumferential direction each form an annular-portion-like channel, which preferably extends concentrically to the axis of rotation of the tool holder entirely in the interior of the portion. Ideally, the cavities each form an annular channel, which is completely self-contained in the circumferential direction.

A further development alternative provides that that the tool holder has a plurality of cavities, which extend substantially in the direction parallel to the axis of rotation or along a helical line that winds around the axis of rotation and which are located preferably symmetrically to one another in the circumferential direction. Such, structures also have a good damping characteristic and have additionally proved to be especially effective means for preventing so much heat to be fed to the tool shaft prematurely from the tube part that the shrinking out or undoing the shrink fit is made more difficult.

The cavities, in a plane perpendicular to the axis of rotation or in a plane that completely contains the axis of rotation, should have a round cross section or a flat cross section. A flat cross section is understood to be a substantially rectangular cross section, whose length in the radial direction is less than in the circumferential direction and in the direction of the axis of rotation R. Preferably, such a flat cross section comprises two lateral arcs concave toward the interior of the cavity and two straight lines, joining the arcs.

A hexagonal cross section is optimal, especially where the cavities are located so close together that the partitions between adjacent cavities form a honeycomb structure.

Expediently, the tool holder has more than 10 and preferably more than 15 and ideally more than 25 cavities, each forming an enclave, that are independent of one another and that are all preferably embodied entirely in the portion that forms the clamping surface, which is ideally embodied as a tubular portion. As a result, compared to the corresponding solid material, a reduction in weight can be attained, which makes the manipulation of the tool holder perceptibly easier. Because of the reduction in the inertial mass of the tool holder, this makes itself felt in a positive way not least upon an automatic tool change, without having to accept sacrifices in strength that are a major consideration. Ideally, so many cavities, with such large dimensions, are provided that the mass of the tool holder, not yet equipped with a tool, is reduced by at least 10% and even better by at least 15%—compared with an identically designed tool holder of solid material. Moreover, such an embodiment also leads to a savings of material, which not least in mass production of such tool holders already adds up in a short time and makes itself positively felt.

It is especially favorable if the cavities tar a three-dimensional set of cavities, which is distinguished in that progressively in the radial direction from the inside outward, a plurality of cavities are located one after another, preferably in alignment with one another, and at the same time a plurality of cavities are located one after another in the direction of the axis of rotation R, and preferably are in alignment with one another. Optimally, respective adjacent cavities are located so close together that in a plane perpendicular to the axis of rotation they form a total cross section, whose total area is occupied by a maximum of 60%, and even better a maximum of 40%, of the sum of the cross-sectional area of the lands.

The embodiment possibilities just described lead to a set of cavities, which forms a "honeycomb structure" or "porous structure that is bionically oriented on the principle of large mammal bones: There is no discontinuity in strength, if a hollow bearing structure does not have continuously massive walls but instead is embodied as porous in the vicinity of the center of each wall. This porous structure has an excellent damping action.

Another preferred embodiment provides that at least one but preferably a plurality of cavities are embodied in the main body, in fact in a region located outside the clamping surface or the tube part. Ideally, this at least one cavity is positioned such that in the radially inward direction it is located entirely in a region which is embraced on its outer circumference by the retaining flange for the handling system, for automatic manipulation of the tool holder. In this region, which is typically the most massive part of a tool holder, cavities have until now never been provided for damping purposes. The inventor has made the surprising finding, counter to previous suspicions, that making cavities in this quite massive region certainly does not remain without perceptible effect, but instead a markedly perceptible effect is exhibited, yet without excessively reducing the strength.

Preferably, this at least one cavity in the main body is designed as an annular disk, whose axis of symmetry coincides with the axis of rotation R and whose length in the direction parallel to the axis of rotation is substantially less, preferably by at least a factor of 3, than its length in the radial direction perpendicular to the axis of rotation R.

Alternatively, the at least one cavity can have the form, of a cylindrical ring, whose wall thickness in the radial direction perpendicular the axis of rotation R is substantially less, and preferably at least by a factor of 3, than its length in the direction parallel to the axis of rotation R. A cavity so embodied also exhibits a still sufficiently pronounced effect.

Expediently, a plurality of cavities are located in the direction along the axis of rotation R, or in the direction along a straight line inclined by up to 10° relative to the axis of rotation R, in alignment with one another. As a these cavities come to be located on an imaginary cylindrical or conical jacket. It is especially favorable if a plurality of cavities are located such that they are located on at least two, and even better three, imaginary cylindrical or conical jackets located coaxially one inside the other and the channels located on different cylindrical or conical jackets are not aligned in the radial direction but instead are preferably located with a center offset relative to one another.

This kind of regular arrangement and the aforementioned further provisions have a favorable effect on the vibration behavior.

The invention moreover addresses the problem of how the damping and/or clamping behavior of a tool holder can be varied hydraulically in the most reliable way.

In the prior art, it is known that the damping and/or clamping behavior of a tool holder can be varied by providing at least one cavity in the tool holder, which cavity is put more or less strongly under hydraulic pressure as needed. The previously known constructions typically operate either with individual bores, made retroactively from outside into the tool holder, or with cavities inside the tool holder, which are either formed by regions that are sealed off from the outside by a lid or a tube thrust into the tool holder, or are formed by forming the tool holder of two portions that are welded together and as a result between them form the cavity or cavities.

These cavities produced in multiple parts require careful sealing. The effort and expense for sealing increases sharply especially wherever work is to be done with high hydraulic internal pressure, in order to brace the tool holder with great force intrinsically. Not least, cavities produced in multiple parts by the use of lid inserts or bushes are increasingly threatened with leakage as the pressure rises. In particular, gradual leakage in operation that goes unnoticed at first is extremely unwanted, since the prestressing of the tool holder that changes gradually is usually not noticed until the machining quality attainable with it has dropped significantly.

It is the object of the invention to provide an improvement here.

For attaining this object, a tool holder for chucking of a tool shaft by frictional engagement, having a main body for coupling the tool holder to the spindle of a machine tool and having a clamping surface, joined to it, or a tube part joined to it, for fixation or shrink fitting of a tool shaft is proposed, which is distinguished in the tool holder has at least one portion shaped in one piece by primary shaping, in which an outer connecting channel, preferably beginning at the outer circumference, is embodied that extends into the interior of the portion and there widens, forming at least one cavity; this cavity is located entirely in the interior of the portion—that is, an adjacent portion, such as a lid, bush, or a main body welded to the tube part, is not involved in the formation of the cavity. The term "widening" in the sense of the invention can be used, as soon as the inside cross section of the outer connecting channel (viewed along its primary flow direction) is less than the sum of the inside cross section or sections of the cavity or cavities communicating with it.

In the affected portion, a relatively large cavity is accordingly embodied, which can be put under hydraulic pressure from outside via a small opening, with the aid of a pressure transducer, in the desired manner. The cavity or cavities are tight on their own, even at the most extremely high internal pressures, since they are embodied entirely inside the applicable one-piece portion. Only the outer connecting line or outer connecting lines require careful sealing. This can be reliably accomplished without major effort or expense.

Preferably, the at least one cavity is filled with a fluid, and a pressure transducer, preferably to be actuated from outside, is built into the at least one outer connecting channel, by means of which transducer the fluid can be subjected to pressure.

It is especially favorable, if here as well the cavities form a three-dimensional set of cavities, which is distinguished in that progressively in the radial direction from the inside outward, a plurality of cavities are located one after another, preferably in alignment with one another, and at the same time, in the direction of the axis of rotation R, a plurality of cavities are located one after another, and preferably in alignment with one another. Via a set of cavities of this kind, a precisely metered and spatially desirably defined, distributed pressure action can be generated over a wider area.

Optimally, at least 10 and even better at least 20 such cavities are present, which are preferably all located in the interior of the one-piece tube part. The cavities expediently communicate with one another via internal connecting channels. At least one cavity communicates directly, via at least one outer connecting channel, with a pressure transducer, so that via the pressure transducer, the pressure of the fluid with which the cavities are filled can be specified in advance.

The invention also addresses the question of how coolant or cooling lubricant is fed from the coupling side of the tool holder to its end toward the tool in a simplified way, in order to enable optimally cooling or lubricating the area in which the tool is in engagement with the workpiece.

In the prior art, it is known for this purpose to make a plurality of bores, intersecting one another, into the wall of the tool holder in order in this way to create a continuous fluid line from the area of the coupling, of the tool holder to its end toward the tool. In so doing, at least one substantially radially extending bore must be made, which meets a bore extending substantially in the direction of the axis of rotation. This radially extending bore, where it intersects the outer circumferential surface of the tool holder, must be closed. This takes effort and expense to accomplish. Moreover, such a closure represents an accumulation of mass, which increases the imbalance that has to be balanced again then.

This object is attained by a tool holder which has at least one coolant supply line that and extends from the side of the tool holder toward the tool that is to be chucked into the main body and preferably discharges into the inner chamber bounded thereby. The coolant supply line changes its directional course at least one location, without having a side arm formed by a bore made into the tool holder from the outer surface of the tool holder. As a rule, at least the portion of the tool holder in which the coolant supply line extends is constructed from a metal layer material.

Expediently, the coolant supply line has at least one portion that extends substantially in the radial direction.

The invention also addresses the question of how in tool collet chucks in the form of shrink-fit chucks the undoing the shrink fit can be better improved and has therefore set as its object making a shrink-fit chuck available that makes even better undoing the shrink fit possible than the shrink-fit chucks known before.

This object is attained by a tool holder having a main body for coupling the tool holder to the spindle of a machine tool and a tube part, joined to it, for thermal or hydraulic clamping of a tool shaft, which is distinguished in that the outer circumference of the tube part has an induction portion, which comprises a metal that is electrically and magnetically conductive; moreover, the tube part has a portion, located inside the induction portion, that comprises a metal with a higher coefficient of thermal expansion than the metal comprising the induction portion and both the induction portion and the portion of the tube part located inside the induction portion are an integral, one-piece component circumferential wall of the tube part.

The invention furthermore addresses the problem of how complex structures, in particular those that are only poorly accessible from outside and/or are undercut, of a tool holder can be manufactured. Complex structures can be manufactured using a so-called layer-melting process, in which the structure to be generated is produced by welding or sintering metal material onto it point by point or layer by layer.

By its nature, however, a layer-melting process progresses only slowly in production and is therefore intrinsically not predestined for mass-producing objects with a relatively large metal mass.

It is therefore a further object of the invention to disclose a tool holder which, despite its complex structures, can be manufactured more rationally than before.

This object is attained with a tool holder (which is preferably embodied for clamping of a tool shaft at least predominantly by fictional engagement) that has a main body for coupling the tool holder to the spindle of a machine tool and also has a clamping portion joined to it, which is preferably embodied as a tube part for shrink fitting insertion of a tool shaft. A first portion of the tool holder comprises forged, rolled or cast metal, which as a rule indicates a corresponding microstructure of this first portion. A second portion of the tool holder comprises a metal layer material. The term "metal layer material" here designates a material that comprises individual metal layers, zones or points that have been successively melted onto one another or welded or sintered to one another. This is often done with the aid of a laser. This type of primary shaping, too, as a rule leaves a characteristic microstructure behind, so that the type of production of the tool holder in this case is expressed in a physical property.

It should be noted that the term "metal layer material" in each case describes a material that in not-insignificant proportions and preferably predominantly—relative to its mass—comprises metal. The metal layer material can comprise exclusively metal layers, zones or points, even without other kinds of components, or at least without other kinds of components that go beyond the category of contaminants. It can be expedient to mix in different metals and/or alloys thereof. For instance, the use or addition of at least one shape memory alloy (FGL) has proved expedient. Optionally, however, the metal layer material can also be made from at least one metal starting material or one metal powder, which contains components, affecting the material properties, of at least one nonmetal material. The addition or admixture of a ceramic material and/or of at least one carbon compound and/or of at least one plastic or at least one bonded fiber material formed with the involvement of the plastic can be considered here.

Such additions of material can be done throughout or only locally.

The major advantage of this type of manufacture is that the particular portion (as a rule, the main body), which can be machined much more rationally in the conventional way, continues to be so machined. The slower layer-melting process is used only for the spatially limited second portion, in or on which the complex structures are embodied, which conventionally are difficult if not impossible to manufacture. This makes the production process multiple times faster, without having to dispense with embodying complex structures.

This object is furthermore attained by a method as recited in the coordinate method claim. Within the scope of this method it is provided that a tool holder having a main body for coupling the tool to the spindle of a machine tool and having a clamping surface, preferably in the form of a tube portion, joined to it for fixation and in particular for shrink fitting of a tool shaft is produced such that a first portion, preferably the main body, is produced as a rotary part from the solid or from a pre-forged or precast blank, preferably of tool steel, and a second portion, preferably the tube part, is constructed of individual metal layers that are generated successively on one another, until the clamping surface has a predetermined shape. It should also be noted that the second portion may possibly be only a local area of the tool holder, for instance an undercut area to be embodied only locally, which is recessed from the tool holder, conventionally made by metal-cutting machining, and is then introduced afterward with the aid of a layer-melting method, in order to complete the tool holder.

Preferably, the method is carried out such that the metal layers forming the second portion are melted from a mixture of different or differently alloyed metals. In this way, certain areas of the second portion can be made especially useful in terms of material for certain tasks. For instance, places that are particularly locally stressed can be made from a material with increased resistance, without having to make the entire second portion at the same time from this kind of material, which is not infrequently expensive, and putting it into, the desired form might be feasible only by expending more time. The same is true for places where for instance especially high electrical and/or magnetic conductivity is expected. For example, the clamping portion embodied as the tube part can be given an outer portion which comprises a metal material in which, under the influence of a magnetic alternating field, heat can be generated inductively, and it can contain an inner portion, joined in a single material with it and embodying the tool receptacle, that comprises a metal material which has higher thermal expansion than the material of the outer portion.

Quintessentially, the composition of the metal layers is locally varied more than merely insignificantly, in such a way that locally, the metal layers have special mechanical and/or electrical and/or magnetic properties.

Preferably, the production method of the invention is carried out such that the aforementioned second portion, after the conclusion of the melting onto one another or welding to one another of the individual layers, is subjected to a heat treatment. Preferably, this heat treatment brings about a change in microstructure and/or ideally ensures that the intrinsic stresses in the first portion are diminished.

The method of the invention can be performed especially efficiently if the first portion of the tool holder, which comprises forged or cast metal, is used as a substrate, onto which the second portion of the tool holder, which comprises a metal layer material, is gradually applied. In this way, especially high positional accuracy of the first and second portions relative to one another can be ensured, which has a favorable effect on the most precise possible concentricity, which a tool holder of this kind should have. Moreover, a separate connection operation and the precise alignment of the portions relative to one another required in the course of the connection operation become unnecessary.

For other instances of use (namely those in which the second portion is to be subjected to an especially expensive heat treatment), it has proved favorable for the first portion or the tube part first to be connected to the main body after the conclusion of the heat treatment, so that the heat treatment of one part of the microstructure does not affect the other part. Logically, the same applies if the main body, for instance, is subjected to case hardening. The aforementioned connection is preferably made by welding, and in particular by means of a friction welding operation.

The second portion or the tube part, after the conclusion of the melting onto one another or welding to one another of the individual layers and preferably after the ensuing heat treatment, is subjected to rotary machining and/or external circular polishing. In the process, such a machining ideally takes place only after the main body is connected to the tube part, since in this way precise concentricity of the tool holder can be achieved most simply.

On a case by case basis, it may be expedient that the portion shaped in one piece by primary shaping comprises solely metal layers, zones or points, entirely without other components or at least without other components that extend beyond the category of contaminants.

On the other hand, the portion shaped in one piece by primary shaping can be produced from at least one metal starting material or a metal powder, which includes components of at least one nonmetal material that affect the tool properties.

Further embodiment possibilities, effects and advantages can be learned from the ensuing description of some concrete exemplary embodiments in conjunction with the drawings.

BRIEF DESCRIPTION OF THE DRAWINGS

The description will be made in conjunction with the drawing figures listed below.

FIG. 1 shows a first exemplary embodiment of the invention in a section along the axis of rotation R.

FIG. 2 shows the same section as FIG. 1, in a perspective view.

FIG. 3 shows a second exemplary embodiment of the invention in a section alone the axis of rotation R.

FIG. 4 shows the same section as FIG. 3, in a perspective view.

FIG. 5 shows a view from the front, in a section taken along the line A-A.

FIG. 6 shows an enlarged detail of a cavity of FIG. 3.

FIG. 7 shows a third exemplary embodiment of the invention in a section along the axis of rotation R, that is, in a section taken along the line B-B.

FIG. 8 shows a perspective view of the third exemplary embodiment, in a section along the line Y-Y.

FIG. 9 shows a view from the front, also in a section along the line Y-Y.

FIG. 10 again shows a sectional view of the third exemplary embodiment, in a section along the line C-C.

FIG. 11 shows a fourth exemplary embodiment of the invention in a section along the axis of rotation R.

FIG. 12 shows a perspective view of the fourth exemplary embodiment, in a section along the line D-D.

FIG. 13 shows a view from the front, again in a section along the line D-D.

FIG. 18 again shows the fifth exemplary embodiment, in a section along the axis of rotation R but at a different section angle.

FIG. 19 shows a sixth exemplary embodiment of the invention in a section along the axis of rotation R.

FIG. 20 shows a view from the front, in a section along the line G-G.

FIG. 21 shows a perspective view of the sixth exemplary embodiment, which is cut away.

FIG. 21a shows the area marked X in FIG. 21 on a larger scale.

FIG. 22 again shows the sixth exemplary embodiment, in a section along the axis of rotation R but at a different section angle.

FIG. 22a shows a perspective view of the seventh exemplary embodiment, which is cut away.

FIG. 22b shows the area marked X in FIG. 22a on a larger scale.

FIG. 23 shows an eighth exemplary embodiment of the invention in a section along the axis of rotation R.

FIG. 24 shows a perspective view of the eighth exemplary embodiment, which is cut away.

FIG. 24a shows the area marked X in FIG. 24 on a larger scale.

FIG. 25 shows a ninth exemplary embodiment, which is closely related to the eighth exemplary embodiment.

FIG. 25a shows a tenth exemplary embodiment of the invention in a section along the axis of rotation R.

FIG. 25b shows a perspective view of the tenth exemplary embodiment, which is cut away.

FIG. 25c shows the area marked X in FIG. 25b on a larger scale.

FIG. 36 shows a fifteenth exemplary embodiment in a section along the axis of rotation R.

FIG. 37 shows an enlarged area of the cutter head, which is marked in FIG. 36 by a circle.

DETAILED DESCRIPTION OF THE PREFERRED EMBODIMENTS

Figure 14:
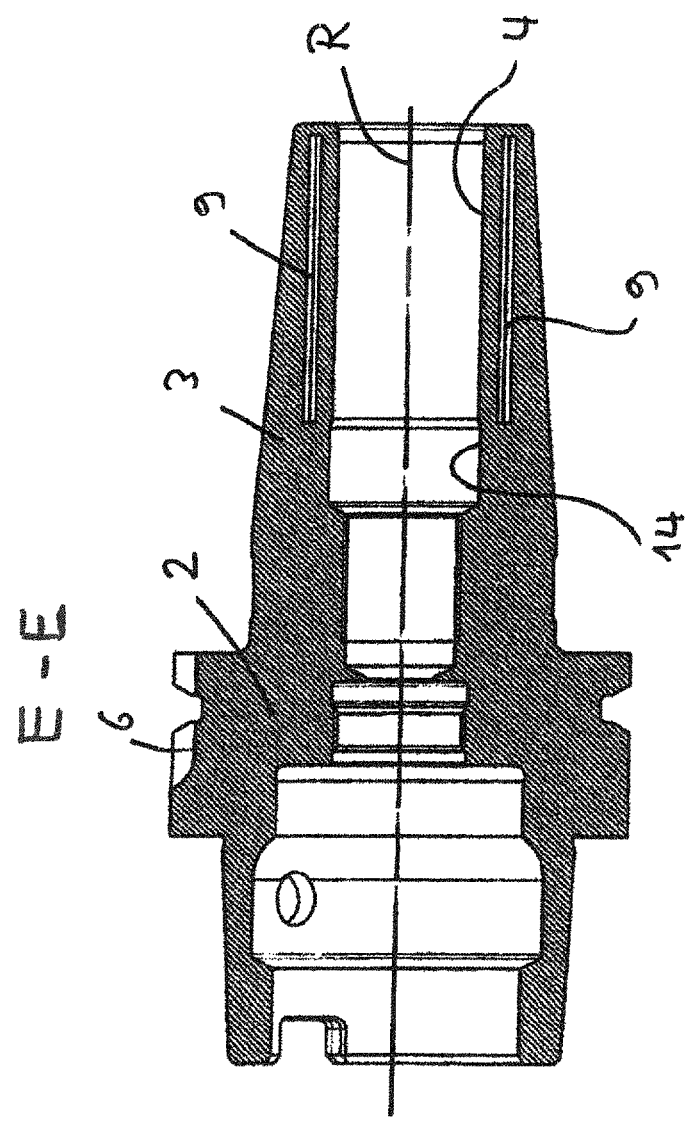
FIG. 14 again shows a sectional view of the fourth exemplary embodiment, in a section along the line E-E.

The first exemplary embodiment will now be described in conjunction with FIGS. 1 and 2.

This tool collet chuck 1 comprises a main body 2 and a tube part, protruding from it, which in this exemplary embodiment forms the clamping portion 3 (in the corresponding exemplary embodiments hereinafter, this will be called "the tube part 3" for short throughout, but what is meant is always "the damping portion 3 embodied in the form of a tube part"). A tool receptacle 4 is embodied in the interior of the tube part 3.

The tool collet chuck is embodied as a so-called shrink-fit chuck, which is generally preferred. The inside diameter of the tool receptacle 4 embodied in the tube part 3 is somewhat smaller than the outside diameter of the tool shaft, not shown, so that the tube part 3 keeps the tool shaft, not shown, firmly in a press fit as soon as the tube part 3 cools down again after the insertion of the tool shaft. As seen quite well in FIG. 1, the main body 2 has a coupling portion 5. The latter serves to couple the unit comprising the tool collet chuck 1 and the tool held by it to a machine tool. The coupling portion is embodied here as a hollow shaft coupling (HSK coupling), which is advantageous, but the protection sought is not limited to this. Instead, protection is also sought for other kinds of embodiment of the coupling, such as a steep-taper conical coupling shaft.

Furthermore, as a rule, the main body 2 has a retaining flange 6, to which a handling system of any type can be connected in order to be able to manipulate the tool collet chuck 1 in an automatic change of tools.

As seen from a glance at FIGS. 1 and 2, the tool holder here is embodied in multiple parts; that is, it comprises at least two portions shaped by primary shaping independently of one another, which have been joined together later. In the present case, these are the main body 2 and the tube part 3. The main body 2 is preferably produced conventionally by metal-cutting machining from the solid or metal-cutting of a pre-forged blank. It is favorable to produce the main body 2 from a steel that can be subjected to case hardening.

It is striking that the main body 2 here does not end directly adjoining its retaining flange 6, but instead changes over on its side toward the tool from the retaining flange 6 with a sudden change in diameter to a reduced diameter that can be called an attachment portion 8. This attachment portion 8 is from the outset an integral component of the main body 2 and is shaped by primary shaping together with it. Preferably, the attachment portion is designed such that the tube part 3 can adjoin it without a change in diameter. The tube part 3 is preferably produced in one piece by a layer-melting process. Such a layer-melting process is distinguished in that the component is produced layer by layer; that is—usually with the aid of a laser—a further layer of a metal originally in powder form, is melted or sintered onto every previous layer.

After this, the tube part 3 is preferably subjected to a heat treatment, with the aid of which the desired microstructure of the metal material is established. Separately from this, the main body 2 is in turn subjected to a heat treatment and/or case hardening.

As a rule, the procedure is such that the tube part 3 is thereupon joined to the main body 2. Preferably, the joining is done by welding, ideally so-called friction welding, in which the two components are pressed firmly against one another and in the process rotated relative to one another, so that the two components, as a result of the heat of friction, beat up so intensely at their contact face K that they finally fuse together; see FIG. 1.

This is usually followed by further machining, in the context of which the tool holder is twisted off at its outer circumference and/or polished, and the tool receptacle 4 is rubbed or subjected to internal circular polishing.

Finally, the tool holder is weighted and is then ready for use.

Instead of later fusing together, as has just been described, the procedure can also be such that the conventionally produced main body 2 is used as a substrate, onto which the tube part is applied step by step or layer by layer. The tube part 3 shaped by primary shaping from one piece on the specification of what is said above is distinguished in that in its interior, it has many cavities 9 extending in the circumferential direction, each of which here forms a self-contained annular channel in the circumferential direction. Each of these cavities shown in FIGS. 1 and 2 forms one complete enclave in the tube part 3, and thus does not communicate anywhere with the surroundings of the tube part or with some other cavity, even locally. In the concrete preferred case, there are more than 20 cavities. Each of the cavities has already been formed in the course of the primary shaping of the tube part, and thus has not been machined afterward into the tube part.

As can be readily seen from the drawings, the cavities 9 form a set of cavities. It is distinguished in that a plurality of cavities are located one after another, preferably in alignment with one another, in the direction of the axis of rotation R. Preferably, a plurality of cavities are also located one after another progressively in the radial direction from the inside outward. Ideally, these cavities are also in alignment with one another in the radial direction. Such an arrangement leads to a three-dimensional set of cavities, which from the constructive standpoint makes a very sensitive adjustment of the chucking characteristic (hardness of the chucking) and of the damping characteristic possible.

A modification, not shown in the drawings, has an appearance such that individual cavities of those shown in FIGS. 1 and 2 do not form an enclave but instead communicate with the surroundings of the tube part.

In the sectional planes that completely contain the axis of rotation, the cavities 9 ideally each have a hexagonal cross section, so that in a sectional plane in which the axis of rotation R is located, a honeycomb structure ensues; see FIG. 1.

With reference to FIG. 1, it can be noted that the cavities 9 are located on three imaginary circular cylinders, each of which is concentric with the axis of rotation R and has different mean diameters R1, R2 and R3. The cavities 9 each located on an imaginary circular cylinder are in alignment with one another in the direction of the axis of rotation R of the tool holder. Those cavities 9 that are located on the second imaginary circular cylinder, whose radius R2 is somewhat greater than the radius R1 of the first imaginary circular cylinder, are not aligned in the radial direction with the cavities that are located on the first imaginary circular cylinder instead, they are offset, preferably center-offset. This means that each cavity that is located on the second imaginary circular cylinder is located (viewed perpendicular to the axis of rotation R) in the interstice between two cavities 9 that are both located on the first circular cylinder having the radius R1. As can be seen from the drawings, this means that the cavities are very close together and ideally are located such that cavities located on adjacent circular cylinders overlap in the direction along the axis of rotation R.

Preferably, those cavities 9 that are located on the third imaginary circular cylinder, whose radius R3 is greater than the radii R1 and R2, are located in the radial direction in alignment with the cavities 9 of the first imaginary circular cylinder.

As can easily be seen from FIGS. 1 and 2, the cavities 9 are each located close together, so that the lands between two adjacent cavities each have a length that is less than the maximum cross section of each of the adjacent cavities.

It has proved especially favorable for adjacent cavities 9 each, to be located so close together that in a plane that completely contains the axis of rotation R, they form a total cross section whose total area is occupied by a maximum of 60%, and even better a maximum of 40%, by the sum of the cross-sectional area of the lands. Whether this requirement is met can be ascertained quite simply. Around the set of cavities, an imaginary cable line spanning the set of cavities from outside is drawn around the set of cavities in the cross-sectional plane. The area encompassed by the cable line is the total cross-sectional area. Some of this computational cross-sectional area is formed by the sum of the areas that the lands contribute; the remainder of this area is formed by the sum of the cross-sectional areas of the individual cavities 9. Preferably, the aforementioned ratio of these areas is maintained.

As a result, the porous structure shown in FIGS. 1 and 2 results, which has an excellent damping action and has an influence on how rigidly the tool shaft is chucked. The pores, however, must not reach as far as the surface of the bearing structure, or at most only a few of them do so; instead, they should actually form enclaves closed on all sides in the interior of the respective bearing structure.

The damping action of the cavities makes itself optimally perceptible especially whenever the cavities, viewed in the direction of the axis of rotation R, already extend substantially over the entire length, or at least ⅔ of the length, of the tool receptacle 4 that keeps the tool shaft chucked by press-fitting. It has proved especially favorable if the individual cavities are small-celled, in the sense that the cross section of individual cavity, in the plane that entirely contains the axis of rotation R, is smaller than 60 mm² and ideally even smaller than 30 mm² and in especially favorable cases even smaller than 15 mm².

Surprisingly, such a set of cavities develops an especially advantageous damping effect particularly whenever the individual cavities 9 have not been made retroactively by erosion or drilling, but instead have already been machined into the tube part 3 in the primary shaping. They then have a very precise geometrical shape and a precise location relative to one another—without later interfering with the microstructure of the tube part 3. Precisely those cavities 9 that are embodied as genuine enclaves and have no locally weakening opening with which they communicate with the surroundings of the tube part 3 develop an especially advantageous, strongly damping effect.

As a rule, a set of cavities located in this way simultaneously has still another substantial advantage: The set of cavities is located such that the heat generated in the outer circumferential surface (skin effect) of the tube part 3 with the aid of an induction coil, not shown, which heat is meant to be used for undoing the shrink fit, or shrinking out, penetrates only with some delay into the vicinity of the tool shaft. As a result, the time slot within which the tool shaft can be pulled out of the tube part that has been inductively heated and thereby widens becomes longer. This facilitates the shrinking out substantially.

It has proved especially advantageous if, between the inner surface of the tool receptacle 4 and the smallest imaginary circular cylinder on which cavities are located, there is an unimpeded cylindrical portion that is continuous in the direction of the axis of rotation, the least wall thickness W of which amounts to at least 1 mm and preferably at least 2 mm; see FIG. 1. Moreover, it has proved especially favorable if the cavities, on the distal end of the tube part 3, toward the tool, are covered by a wall that forms an integral component of the tube part and that has a wall thickness WK of at least 1 mm and preferably at least 2 mm. The same logically applies to the wall thickness WU of the wall portion embodied as an integral component of the tube part 3, which wall portion divides the cavities from the outer circumferential surface of the tube part. This advantageous form of embodiment applies through all the exemplary embodiments.

With the aid of the cavities described, still a further effect can be achieved:

Thick-walled shrink-fit chucks for heavy-duty use often have a tendency to warp upon inductive heating of the tube part for the sake of removing the tool shaft from the chuck. This sometimes makes the shrinking out much more difficult.

Figure 30:
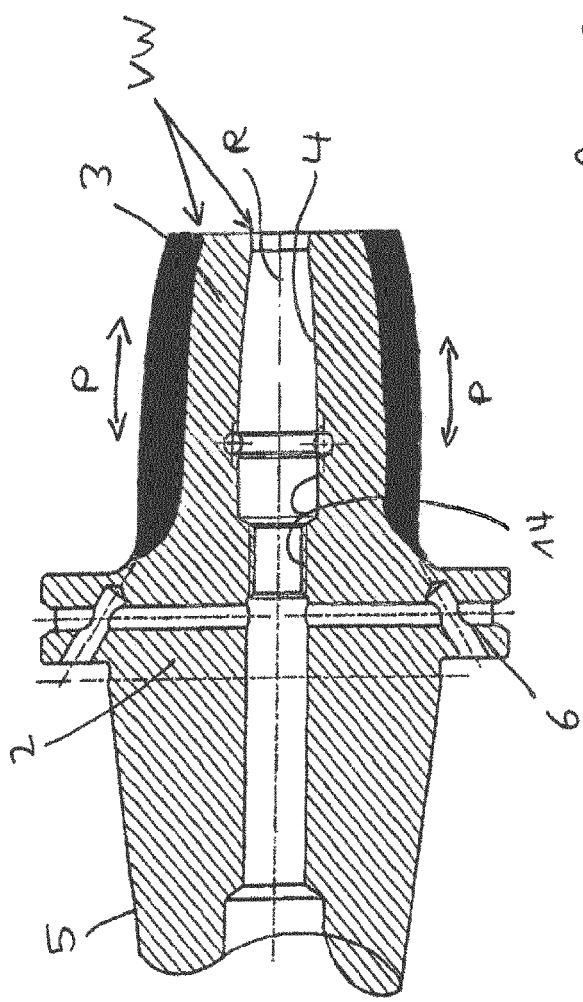
FIG. 30 shows a thick-walled shrink-fit chuck from the prior art and serves to illustrate the problems to be encountered in the prior art.

This warping is due to the fact that in the inductive heating, first the outermost circumference of the shrink-fit chuck heats strongly, and the heat inductively generated is transported onward by thermal conduction into the vicinity of the interior of the shrink-fit chuck only with some delay. Precisely where the shrink-fit chuck is embodied with thick walls, the situation then arises at some time or other that the outermost layer, shown in black, in FIG. 30, of the tube part 3 has already heated strongly and has also already strongly expanded in the direction of the axis of rotation R, which is symbolized in FIG. 30 by the arrow P. At that time, the inner layers of the tube which are surrounded by the outermost layer of the tube part, are still cold, and by then they have neither expanded in the radial direction nor in the direction of the axis of rotation R. As a consequence, the end toward the tool of the tube part 3 is thrown inward; see FIG. 30. This is counterproductive, since as a result an additional clamping force is exerted on the tool shaft, which counteracts the tendency of the tube part 3 to let go of the tool shaft in the course of the heat-caused expansion of the tool receptacle.

This problem, too, can be overcome by using the cavities 9 of the invention.

For instance, it is an attractive option to provide a number of cavities of the invention (optionally, additional cavities), in the vicinity of the wall of the tube part 3 that is located closer to the tool receptacle than to the outer circumference of the tube part 3.

Figure 31:
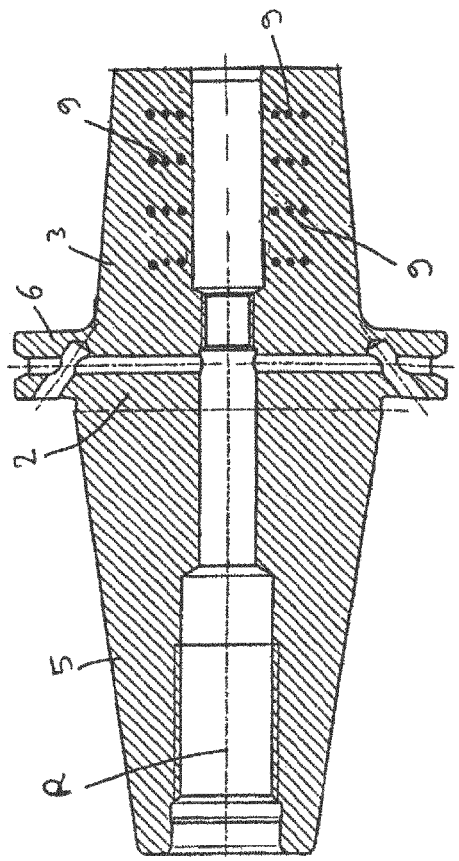
FIG. 31 shows a thirteenth exemplary embodiment in a section along the axis of rotation R.

Precisely how these cavities should be located depends in the final analysis also on the individual case and is therefore easy to determine from conventional tests for the individual case. As a rule of thumb, it can be said that the cavities 9 must be located in such a way that they weaken an inner region of the tube part in the direction parallel to the axis of rotation R so much that this inner region of the tube part does not substantially hinder the expansion of the already-hot outer region of the tube part in the direction of the axis of rotation R, because the already-hot outer region of the tube part can impose an expansion in the direction of the axis of rotation R on the weakened inner region of the tube part, despite the lack of heating there or the only slight heating there. A rough impression of how these cavities should approximately be located for a particular application of this kind is given in FIG. 31.

FIGS. 3 through 5 show a second exemplary embodiment of the invention, which is substantially equivalent to the first exemplary embodiment of the invention described in further detail in FIGS. 1 and 2. As a result, what is said for the first exemplary embodiment applies to this second exemplary embodiment as well, unless differences arise in the ensuing descriptions of this second exemplary embodiment.

In this second exemplary embodiment, the main body 2 and the tube part 3 have been created front the outset in one piece by being jointly shaped by primary shaping. Here, it is the case that the entire tool holder has been constructed by a layer-melting process of the type described above. This takes longer than the above-described production from two separate blanks produced separately from one another by primary shaping, but it has the advantage that the microstructure is not impeded by welding, and furthermore a virtually perfect concentricity of the tool holder can be ensured even more simply.

The cavities 9 are located relative to one another in the manner described above in the context of the first exemplary embodiment.

In particular, here as well, the cavities 9 are circular rings that are self-contained in the circumferential direction; see FIG. 5.

This second exemplary embodiment is distinguished from the first exemplary embodiment in that the cross section that the cavities here each have in a sectional plane that contains the axis of rotation is designed somewhat differently from that in the first exemplary embodiment. While this cross section in the first exemplary embodiment was ideally hexagonal, here the cavities have a predominantly rectangular cross section, which is bounded by two rectilinear portions that each define the outer and inner circumference of the cavity, and two portions extending in concave fashion toward the interior of the cavity, which concave portions connect the two aforementioned rectilinear portions to one another. In particular, see FIG. 6. FIG. 6 shows the cross section of an individual cavity of this exemplary embodiment in an enlarged view.

Figure 16:
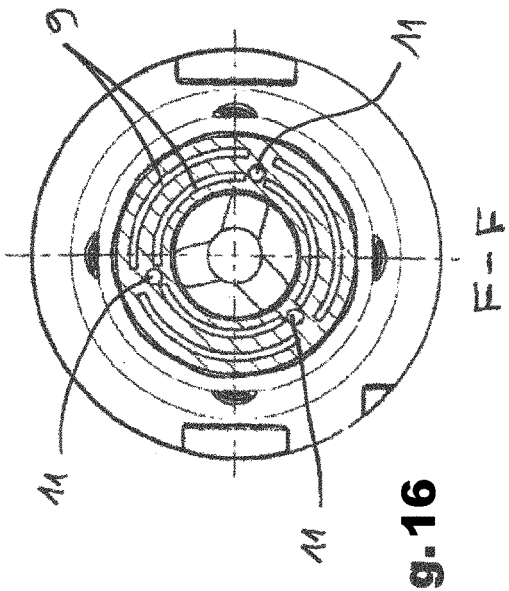
FIG. 16 shows a view from the from the front, in a section along the line F-F.

It is especially advantageous if the cavities in the circumferential direction form a self-contained circular ring, in the way that has been described above for the first exemplary embodiment. However, this is not absolutely necessary. On the contrary, there may be applications in which it is especially favorable if the primary direction of the cavities extends on principle in the circumferential direction (which is the case if the greatest length of the cavity is in the circumferential direction), but the individual cavities each form only circular-annular segments, a plurality of which are located in alignment with one another in the circumferential direction; see for example FIG. 16, which will be addressed again in further detail hereinafter. It is especially favorable in this case if, viewed in the circumferential direction, at least the three cavities shown in FIG. 16, and even better six such cavities, are located in alignment with one another.

For other intended uses, it has proved especially advantageous if the primary direction of the cavities (that is, their greatest length) extends parallel to the axis of rotation R. This embodiment can be readily explained in conjunction with FIGS. 7 through 10.

In the exemplary embodiment shown in FIGS. 7 through 10, the main body 2 and the tube part 3 have been created from the outset by being jointly shaped by primary shaping, by means of the layer-melting process already mentioned. In the course of the primary shaping, as an integral component of the tube part 3 and/or of the main body 2 (not shown here; more about this later), the cavities embodied therein are created. Alternatively, the procedure here can also be as has already been described for the first exemplary embodiment—namely that the tube part 3, including the cavities 9 located in it, is formed in one piece by primary shaping, separately from the main body 2, which in turn is shaped by primary shaping independently of the tube part 3 and is joined later to the tube part 3.

The cavities that are used in this exemplary embodiment of FIGS. 7 through 10 are distinguished in that their length in the direction parallel to the axis of rotation is greater by a factor of at least 5 than their length in the circumferential direction. Preferably, each of these cavities, along the entire length of the tool receptacle 4 or at least ⅔ of the length of the tool receptacle, has a continuously uninterrupted course. Here as well the large number of cavities is striking; as the drawings show, more than 20 cavities are provided here.

The cavities 9 are in principle located relative to one another in the way already described above in detail in conjunction with the first exemplary embodiment.

In this exemplary embodiment as well, the cavities are located on these three imaginary circular cylinders, which are each concentric with the axis of rotation R and have different mean diameters R1, R2 and R3; see FIG. 10. The cavities 9, each located on an imaginary circular cylinder, are located in alignment with one another in the circumferential direction; see FIG. 9. Those cavities 9 that are located on the second imaginary circular cylinder, whose radius R2 is somewhat greater than the radius R1 of the first imaginary circular cylinder, are not aligned in the radial direction with the cavities that are located on the first imaginary circular cylinder having the radius R1. Instead, they are offset, preferably center-offset. This means that each cavity that is located on the second imaginary circular cylinder is located, viewed in the radial direction, in the interstice between two cavities 9 that are both located on the first circular cylinder having the radius R1. In this exemplary embodiment, the cavities located on adjacent circular cylinders partly overlap as viewed in the circumferential direction; see FIG. 9.

Preferably, those cavities 9 that are located on the third imaginary circular cylinder, whose radius R3 is greater than the radii R1 and R2, are radially aligned with the cavities 9 of the first imaginary circular cylinder; again, see FIGS. 9 and 10.

With respect to this exemplary embodiment as well, it has proved especially favorable if the individual cavities are small-celled, in the sense that the cross section of each individual cavity, in the plane that is perpendicular to the axis of rotation R, is smaller than 60 mm$^2$, and ideally even smaller than 30 mm$^2$.

The set of cavities thus located has the damping effect already described in detail above, which here as well is especially and unexpectedly strongly pronounced whenever the cavities are at least predominantly embodied as genuine enclaves, which are entirely self-contained and have no connection whatever with the surroundings of the tube part.

Moreover, a set of cavities located in this way, as FIGS. 7 through 10 show, also exhibits the insulating effect already addressed above, which simplifies the shrinking out.

However, the focus of action in this exemplary embodiment is shifted somewhat:

Even if in an individual case the dimensioning is critical, it can be said as a rough rule of thumb that a set of cavities in which the primary direction of the cavities is in the circumferential direction has an especially pronounced damping effect and a tendency to a lesser insulating effect, while in a set of cavities in which the whose primary direction of the cavities is in the direction parallel to the axis of rotation R, the tendency is the reverse. Such cavities have an especially strong insulating effect and a tendency to a less-pronounced damping effect.

FIGS. 11 through 14 show a further exemplary embodiment, which is closely related to the exemplary embodiment of FIGS. 7 through 10, and what has been said in conjunction with FIGS. 7 through 10 applies accordingly, unless otherwise stated in the ensuing explanations.

In this exemplary embodiment, cavities 9 in a plane perpendicular to the axis of rotation R are equipped with a hexagonal cross section, so that adjacent cavities, or the lands dividing them, form a honeycomb structure.

A striking aspect of this exemplary embodiment is the markedly high number of cavities. There are more than 50 cavities. By far the majority of them (for instance, in this exemplary embodiment shown in the drawing, all of these cavities 9) are embodied as genuine enclaves.

FIGS. 15 through 18 show a further exemplary embodiment of the invention.

This exemplary embodiment of the invention is distinguished in that the main body 2 and the tube part 3 have been created in one piece from the outset by being jointly shaped by primary shaping. The entire tool holder has been constructed by means of a layer-melting process of the type described above.

In this exemplary embodiment, the tool holder is provided with a number of cavities 9, which correspond to the above-described second exemplary embodiment, so that what is said for that embodiment applies to the cavities here as well. Alternatively, it is naturally also possible for cavities to be provided of the kind that illustrate the other exemplary embodiments described above.

Figure 17A:
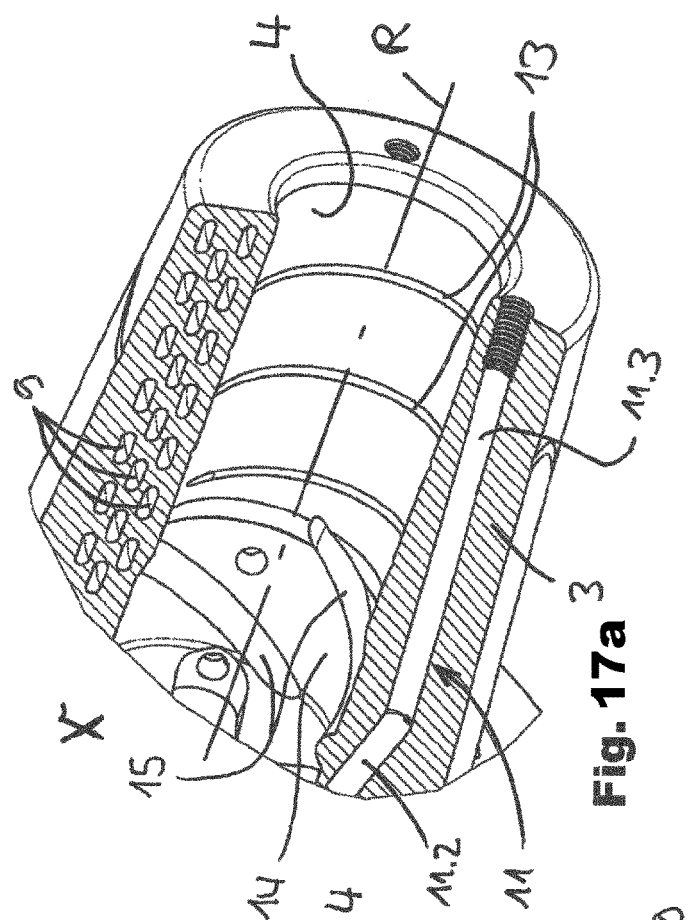
FIG. 17a shows the area marked X in FIG. 17 on a larger scale.
Figure 17:
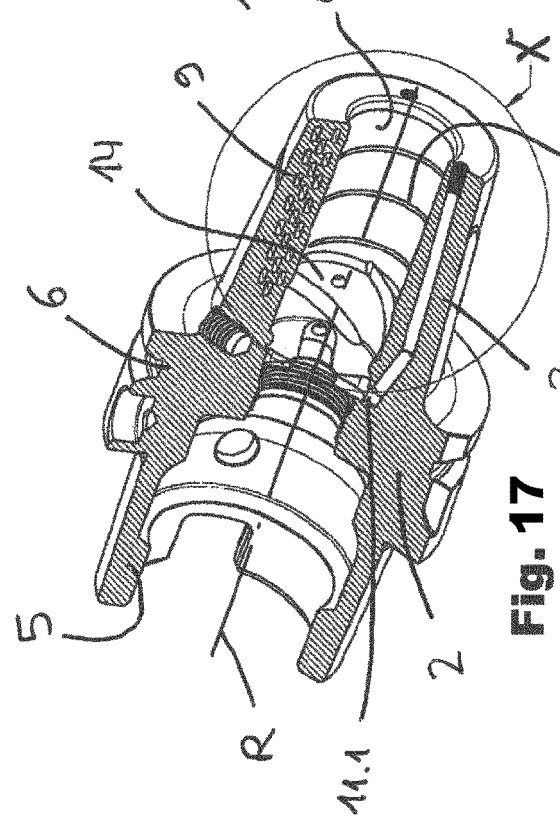
FIG. 17 shows a perspective view of the fifth exemplary embodiment, which is cut away.
Figure 15:
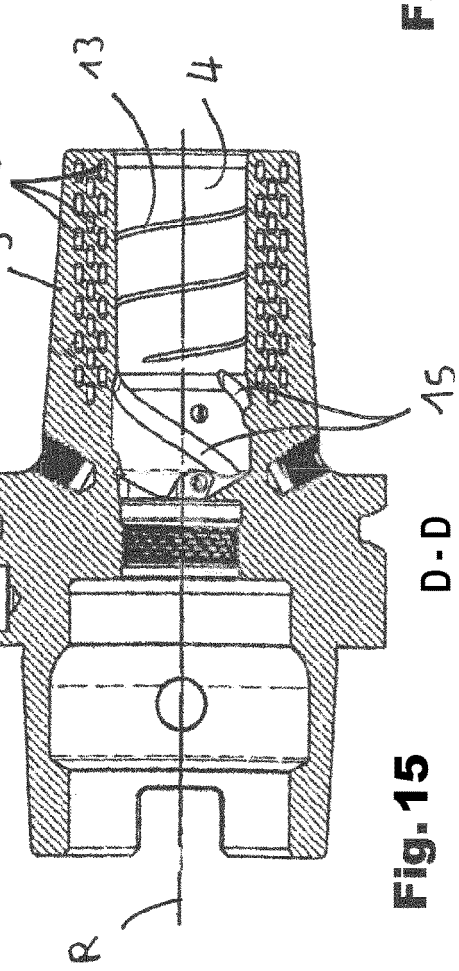
FIG. 15 shows a fifth exemplary embodiment of the invention in a section along the axis of rotation R.

The special aspect of this tool holder is as follows:

The tool holder is provided with at least one coolant supply line 11, as FIG. 17 shows. For this kind of coolant supply line, which will be described in further detail immediately hereafter, separate protection is also claimed; that is, very generally, protection is claimed for a tool holder produced with the aid of a layer shaping process; it has a coolant supply line 11 of the type described in further detail below, regardless of which features it also has otherwise.

This coolant supply line 11 extends from the face end of the tube part 3 of the tool holder into the main body 2. There, it discharges at the inner circumferential surface of the main body. Preferably, this coolant supply line 11 extends to beneath the retaining flange 6 for handling of the tool holder, which retaining flange is provided on the main body.

The special aspect of this coolant supply line 11 is that it does not pierce the tool holder in the radially outward direction, nor has it pierced it at any time.

This coolant supply line 11, for this purpose, preferably comprises at least two and even better three different portions. In the concrete case, the coolant supply line 11 has a first portion 11.1 (FIG. 17), which extends in the radially outward direction, substantially perpendicular to the axis of rotation R, from the inner surface of the main body 2. The radially outward end of this portion 11.1 is adjoined directly by a second portion 11.2, which is preferably rectilinear and extends obliquely to the axis of rotation R from the main body 2 into the tube part 3', see FIG. 17a. Immediately adjoining the end, located in the tube part 3, of this portion 11.2 is a third portion 11.3 of the coolant supply line 11; it extends into the face end of the tube part and discharges there; again, see FIG. 17a.

A T intersection, in the sense that a portion of the coolant supply line 11 extending from the inside outward in the radial direction is intersected laterally along the way by a portion of the supply line extending substantially parallel to the axis of rotation R, is unnecessary here. This makes rational production possible, because the necessity of closing off branches of the coolant supply line 11 that discharge in the outer circumferential surface of the tool holder with a stopper or the like can be dispensed with.

For the sake of completeness, it should be noted that the aforementioned second portion 11.2 and the aforementioned third portion 11.3 of the coolant supply line 11 need not necessarily be different portions. Instead, they can fuse into a single portion, extending in a suitably curved fashion, for instance a banana-shaped curved portion. In logically the same way, naturally, the first portion 11.1 and the two other portions 11.2 and 11.3 can fuse together, for instance forming a coolant supply line that overall preferably extends steadily in J-shaped fashion (not shown in the drawings). The decisive factor is that an ensemble of a plurality of bores, partly made from the outer circumference and needed only partly for the actual fluid line and otherwise forming a "dead side arm" can be dispensed with.

Although this is not shown in the drawings on its own, it may be favorable to lend the coolant supply line 11 a variable, that is, increasing or decreasing, inside cross section in the flow direction. In this way, a pressure drop, for instance, which otherwise occurs over the length of the coolant supply line and interferes there, or which occurs adjoining a branch of the coolant supply line in a plurality of limbs discharging at different locations, can be compensated for.

A further embodiment option, which is easy to implement with the aid of the invention, is the no embodiment of the mouth region. For instance, nozzles oriented radially or in the circumferential direction can be provided. The term "nozzle" is preferably understood to mean a local narrowing or a correspondingly acting deflection region of the flow cross section, which generates a fluid stream that emerges at increased speed and therefore reliably and in a targeted way reaches the region that is to be cooled and/or lubricated. In general, the discharge region can be designed largely freely with the aid of the invention.

A further advantage of this exemplary embodiment is that open grooves 13 are machined into the surface of the tool receptacle 4 for receiving the tool; see in particular FIG. 17a. These grooves are preferably already provided in the course of the primary shaping of the tube part 3 or of the entire tool holder 1, so that in any case, the structure of the base of the groove no longer changes later, even if the tool receptacle is later reamed or polished. The geometry of these grooves 13 can be selected relatively freely. The grooves 13 may be provided in order to exert additional influence on the hardness of the chucking of the tool shaft, or to exert further influence on what amount of heat is transmitted to the tool shaft in the course of the shrinking out again, within which period of time, by the tube part 3. The grooves can furthermore, or alternatively, be provided in order to receive oil residues and soiling that have been stripped off from the tool shaft for instance as the tool shaft is inserted and which interfere with the chucking quality, unless they can be deposited in a region where they are not a problem—but in these grooves, they are a problem.

Moreover, this exemplary embodiment is preferably distinguished in that on the inner surface of the outlet 14, downstream of the tool receptacle 4, one or in this case a plurality of positive-engagement elements are provided, preferably in the form of the protrusions 15—this is an aspect for which separate protection is also claimed; that is, very generally, protection is claimed for a tool holder produced at least partly with the aid of a layer forming process, which has protrusions 15 of this kind regardless of which features it otherwise also has. These positive-engagement elements in the form of the protrusions 15 are preferably embodied on the order of helical, inward-protruding ribs, so-called threaded ribs. The protrusion or protrusions 15 form positive-engagement elements that engage corresponding grooves on the tool shaft and thus bring about a so-called "safelock functionality", that is, protection against the tool shaft's being unintentionally being pulled out in the direction of the axis of rotation R—as described by Applicant in its patent EP 2 004 351. What is decisive is that these protrusions 15 are an integral component of the tool holder and as a rule have already been given their final shape by primary shaping in the course of the production of the tool holder. Advantageously, as mentioned, these protrusions are designed as a threaded rib, so that they have a length in the circumferential direction that is more than merely insignificant and as a result differ from the pin that is proposed in the aforementioned European patent.

FIGS. 19 through 22 show a further exemplary embodiment of the invention. It is closely related to the exemplary embodiment described above in conjunction with FIGS. 15 through 18. What is said there therefore applies to this exemplary embodiment as well, with the following exceptions:

In this exemplary embodiment, the cavities are embodied in the way already described above for the second exemplary embodiment. That is, the cavities are predominantly and preferably all embodied as circular rings that are completely self-contained in the circumferential direction. A number of cavities 9 rests on each of at least two imaginary cylinders of different diameters, in the way already described above. The decisive point now is that between radially successive cavities 9, at least locally so much space remains that at least one and preferably a plurality of coolant supply lines 11 can be passed through the tube part in the direction substantially parallel to the axis of rotation R, without intersecting the cavities 9; see FIG. 20. Preferably here again, at least three coolant supply lines 11 distributed symmetrically over the circumference of the tube part are provided.

FIG. 22a and in particular FIG. 22b show a further important aspect of the invention, in the form of a special coolant damming chamber. Separate protection is also sought for it; that is, very generally, protection is claimed for a tool holder, produced at least partly with the aid of a layer forming process, that has a coolant clamming chamber as described in further detail below, regardless of what features it otherwise also has. In this exemplary embodiment, the coolant supply line 11 does not have, an open discharge site on the face end toward the tool by way of which the coolant exits uncontrolled into the surroundings. Instead, on the face end of the tool holder 1 toward the tool, the coolant supply line 11 discharges into a coolant damming chamber 22. The coolant damming chamber 22 is formed by a groove that functionally divides a storage disk 23 from the tube part 3; however, the storage disk 23 is an integral component of the tube part 3 and is shaped together with it by primary shaping. The storage disk 23 covers the mouth 24 of the coolant supply line 11 and deflects the flow of coolant by more than 60°. The storage disk 23 extends to nearly the tool shaft 25 and forms an annular gap 26 opposite it. This annular gap 26 generates a high-speed coolant stream. The coolant stream is spun closely along the tool shaft 25 and in this way reaches the tool cutting edges, without fanning out substantially along the way, which would cause the stream to be partly lost for cooling the tool cutting edges. If necessary, a number of radially extending slits 27 are provided in the storage disk 23, which additionally vary the shape of the coolant stream.

FIGS. 23 through 25 show a further exemplary embodiment of the invention.

In the exemplary embodiment that these drawings show, no cavities 9 are provided in the vicinity of the tube part 3. This need not necessarily be the case, however; cavities can additionally be provided that are embodied as described above in the context of one of the exemplary embodiments described above.

In the exemplary embodiment which these drawings show, it is moreover such that the main body 2 and the tube part 3 have been created in one piece from the outset by being jointly shaped by primary shaping. The entire tool holder has been constructed by a layer-melting process of the type described above. However, this too need not necessarily be the case. Instead, it can certainly be that the main body 2 and the tube part 3 are shaped by primary shaping separately from one another and only joined together later. That too has already been described above.

The decisive point is that in this exemplary embodiment, the main body 2, outside the tube part 3, has at least one cavity 9 and preferably a plurality of cavities 9, which each represent one complete enclave in the main body 2. Ideally, these cavities 9 are provided in a region of the main body 2 that is embraced on its outer circumference by the retaining flange 6, which serves the purpose of automatic handling of the tool holder.

Precisely this region has been embodied in markedly massive fashion in the tool holders known from the prior art. Surprisingly it has been found that precisely this region has a markedly high damping potential, if one or more cavities 9 are located in it.

It has proved to be highly expedient to provide these cavities each with a cross section the maximum length of which in the radial direction is substantially greater than its maximum length in the direction parallel to the axis of rotation R; see FIG. 23. An especially good outcome, ensues if the maximum length of each cavity 9 in the radial direction is greater by a factor of at least 3 and even better of at least 4 than the maximum length of the cavity 9 in the direction of the axis of rotation R.

If cavities are also provided in the tube part 3, then preferably the volume of a single cavity 9 in the vicinity of the retaining flange is substantially greater than that of the other cavities 9, and this volume is preferably greater by a factor of at least 10 and even better of at least 30 than the volume of a single cavity in the vicinity of the tube part.

Ideally, each of these cavities 9 forms a circular-annular disk, whose axis is coaxial to the axis of rotation R. Preferably, at least two such cavities 9 are provided. It is especially favorable if these cavities 9 are substantially or completely aligned with one another in the direction parallel to the axis of rotation R.

This kind of embodiment and positioning of the cavities 9 is particularly important whenever the cavities 9 do not form an enclave but instead communicate locally with a pressure transducer that can be actuated from outside.

An optional version of this kind is shown in FIG. 25. As can be seen, each of the cavities 9 here has a connecting line 16, which discharges into a threaded portion 17 that is accommodated in such a way that it is accessible from outside, preferably in the vicinity of the retaining flange 6 for the handling of the tool holder. A stopper 18, typically meant to be actuated via a hexagonal socket, is made in the threaded portion 17, and the pressure in the applicable cavity 9 can be adjusted via the depth to which the stopper is screwed in. Depending on how high the pressure being exerted at the time is, the affected cavity 9 has a more or less pronounced damping behavior. The cavities 9 can both communicate with one another and in that case are actuated by a single pressure transducer, which is not shown in the drawings. Alternatively, naturally, an independent pressure transducer for each cavity can be present, as shown in FIG. 25.

FIGS. 25a and 25b show a further exemplary embodiment, which is highly similar to the exemplary embodiment just described and for which what is said there applies accordingly, unless otherwise arising from the difference described below.

In this exemplary embodiment, at least two cavities 9 are provided, which have the form of a cylindrical or conical ring. Preferably, the wall thickness of the respective ring in the radial direction perpendicular to the axis of rotation R is substantially smaller, and in the ideal case by a factor of at least 3, than its length in the direction parallel to the axis of rotation. Preferably, each of the cavities 9 is self-contained in the circumferential direction. It is especially favorable if the cavities are located coaxially one inside the other, so that an outer cavity 9 at least substantially completely embraces an inner cavity 9.

A further exemplary embodiment of the invention is shown in FIGS. 26 through 30. In this exemplary embodiment, the main body 2 and the tube part 3 have been created in one piece from the outset by being jointly shaped by primary shaping. Instead, however, a multi-part embodiment, as described at the outset, is also readily possible.

A set of more than 20 or here even more than 30 cavities 9 is embodied integrally in the tube part and can be designed and located for instance such as has been described in the context of the second exemplary embodiment. A different embodiment and a different location, for instance as described in the context of the first exemplary embodiment are also conceivable.

The decisive point in which the cavities used in the context of this exemplary embodiment differ from the cavities described previously is that the cavities 9, which are embodied in the one-piece tube part 3, in precise terms do not form genuine enclaves. It is true that the cavities 9 are closed substantially on all sides, however, adjacent cavities 9 locally communicate with one another fluidly via connecting portions 19; see FIG. 28*a*. As seen front FIG. 28*a*, the connecting portions 19 typically have an inside cross section in the flow direction that is smaller than the inside cross section of the cavities 9 themselves, preferably by factor of 3 and ideally by a factor of 4. This is favorable since connecting portions 19 shaped in this way on the one hand ensure that the cavities all communicate with one another, so that their internal pressure can be controlled centrally, and on the other, they have such an intense throttling action that because of throttling losses, energy is drawn from the flow that develops under the influence of the vibration to which the tool holder and its cavities 9 are exposed, and a damping effect thus ensues.

Figure 28A:
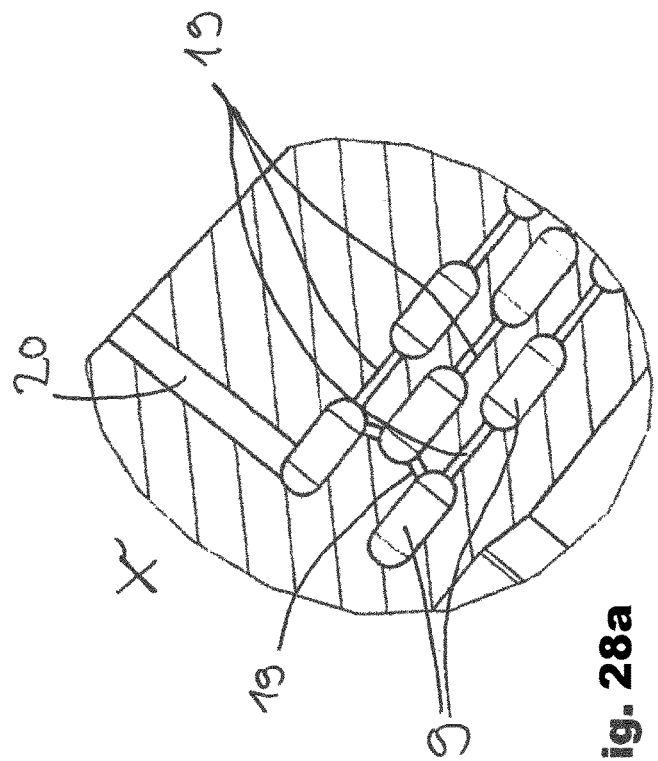
FIG. 28a shows the area marked X in FIG. 28 on a larger scale.
Figure 27:
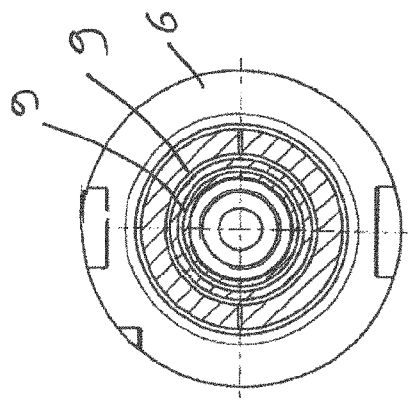
FIG. 27 shows a view from the front, in a section along the line H-H.
Figure 28:
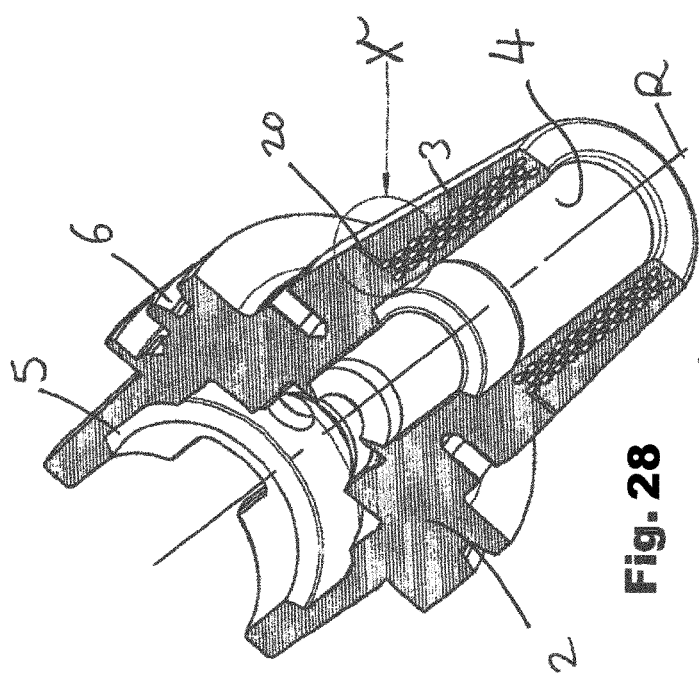
FIG. 28 shows a perspective view of the eleventh exemplary embodiment, which is cut away.
Figure 26:
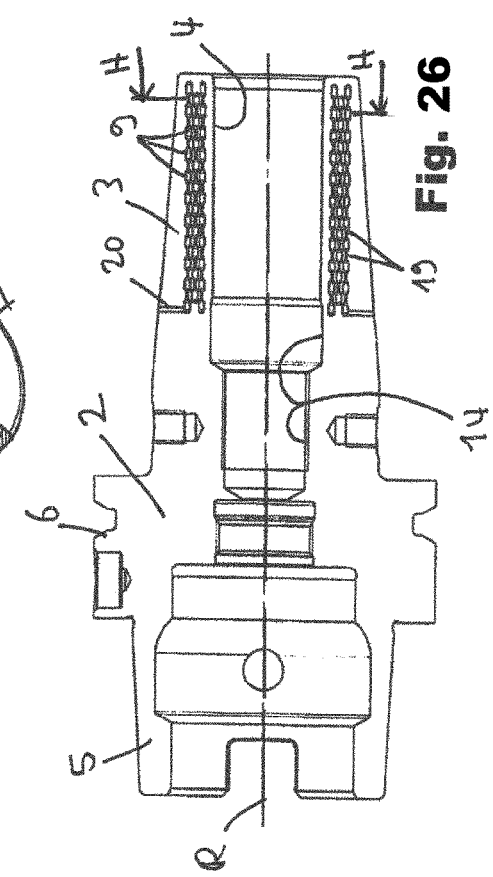
FIG. 26 shows an eleventh exemplary embodiment of the invention in a section along the axis of rotation R.

At least one of the cavities 9 can communicate via an outer connecting channel 20 with the region outside the tube part; see FIGS. 28*a* and 26.

In this way, all the cavities form a network of cavities fluidly communicating with one another, which network can be subjected to internal pressure as needed by applying a suitable pressure via the outer connecting channel 20. Aside from this outer connecting channel 20 or these outer connecting channels 20, however, the cavities do not communicate with the outer environment or the interior of the tube part. With the aid of the network according to the invention, comprising spatially distributed cavities, it is structurally possible, substantially more precisely than before, to "adjust" how and where the tool holder is deformed or stressed by the pressure exerted.

Via this pressure, influence can for instance be exerted on the damping effect of the set of cavities. The higher the internal pressure in the cavities 9, the less is the damping tendency and therefore the harder the clamping of the tool shaft. The pressure transducer can be embodied such as described in the context of the previous exemplary embodiment—for instance, it can be a screw actuated via a hexagonal socket and screwed into the connecting portion, equipped with a female thread (not shown in the drawings), which by the depth to which it is screwed in determines the pressure in the network comprising the cavities 9 communicating with one another.

Optionally, via this pressure, influence can also be exerted for instance on the pressure available for chucking the tool between the tube part 3 and the tool shaft. In that case the cavities must be dimensioned and located in such a way that they generate pressure forces exerted radially inward, when they are correspondingly put under internal pressure. These pressure forces increase (or even in an individual case replace) the pressure exerted by the shrink fitting.

Given a suitable location and embodiment of the cavities, a set of cavities of the kind being discussed in the context of this exemplary embodiment can also be used to facilitate the shrinking out or to enable dismantling the tool shaft. To achieve this, the cavities must be located and embodied such that they have the tendency to widen the interior of the tube part or to widen the tool receptacle when they are put under suitable internal pressure. This too is possibly very simply, especially wherever instead of a few cavities designed arbitrarily, there is a set of cavities of more than 20 cavities and preferably more than 30 cavities, which are an integral component of the tool holder produced in one piece or of the tube part produced in one piece of the tool holder, and which also ideally can be synchronously put under appropriate internal pressure via one or a few pressure transducers, because these cavities all communicate with one another.

Figure 29:
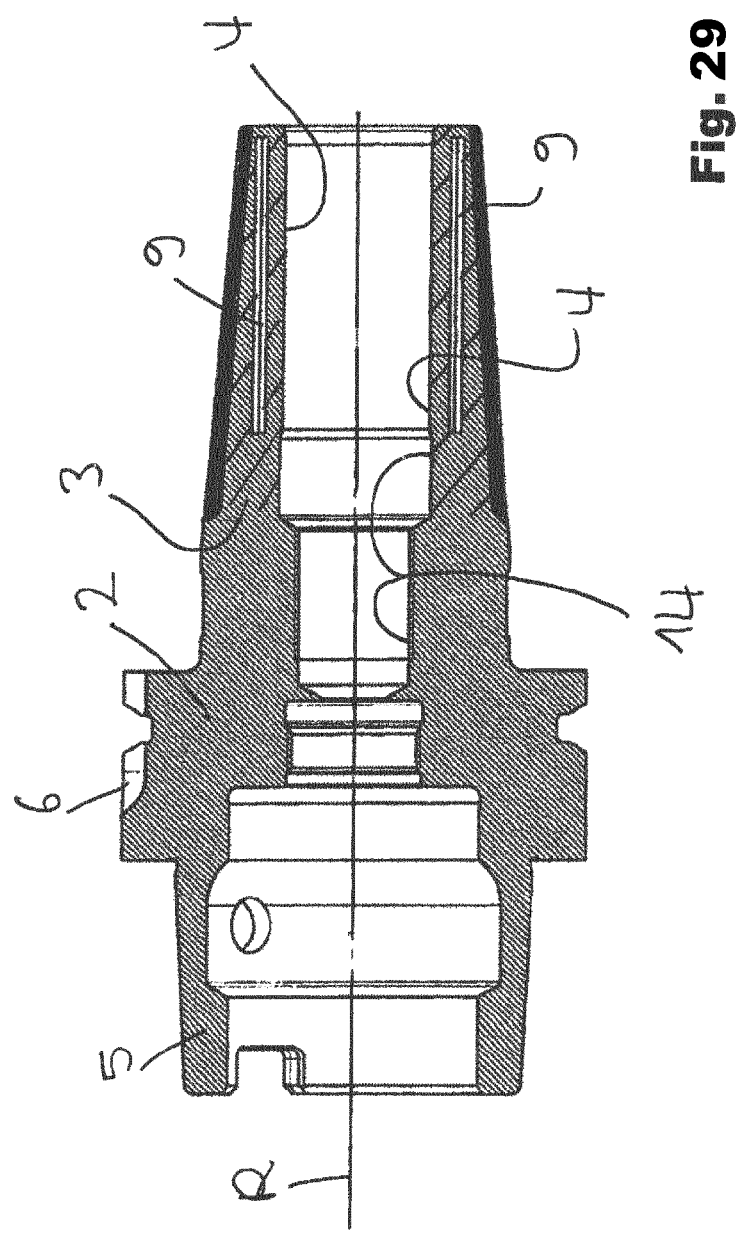
FIG. 29 shows a twelfth exemplary embodiment in a section along the axis of rotation R.

FIG. 29 shows a further, very special exemplary embodiment of the invention. In the exemplary embodiment shown here, it is again true that the main body 2 and the tube part 3 have been created in one piece from the outset by being shaped jointly by primary shaping. However, a multi-piece embodiment is also readily possible here, of the kind described at the outset. Preferably, here as well, integral cavities 9 are formed on the specification of one of the foregoing exemplary embodiments, but in this variant of the invention cavities need not necessarily be present.

The special aspect in this exemplary embodiment is that the outer circumference of the tube part has an induction portion, here shown in black. The induction portion shown in black extends radially inward from the surface of the tube part preferably by 0.3 mm to 1.5 mm, and ideally by at least 0.5 mm to a maximum of 1.5 mm. The induction portion comprises a metal that is electrically and magnetically conductive and therefore heats up rapidly under the influence of a magnetic alternating field. The induction portion is not for instance a tube that has been attached later to the outside of the tube part 3 and secured there. Instead, the induction portion is an integral component of the tube part that has been shaped together with it by primary shaping and therefore, because it intrinsically has the nature of an a priori one-piece connection to the inner portion of the tube part, it exchanges heat by thermal conduction. The induction portion can be shorter, viewed in the direction of the axis of rotation, than what is shown in FIG. 29, but it should have at least substantially the same length in the direction of the longitudinal axis as the tool receptacle 4.

Preferably, at least the inner portion, that is, a portion located inside the induction portion, of the tube part that is marked by cross-hatching comprises a metal that has a higher thermal expansion coefficient than the metal comprising the induction portion shown in black. Often, at least, the metal used for this portion has no electrical and/or magnetic conductivity, or only substantially less electrical and/or magnetic conductivity, than the material of the induction portion. The advantage of such an internal portion is that the internal portion expands very quickly and far as soon as heat is supplied to it, heat that was generated in the induction portion with the aid of an induction coil.

In the context of a preferred embodiment, it is provided that the remainder of the tool holder in turn is joined a priori in one piece to the induction portion and to the portion of the tube part located inside the induction portion, but itself at least locally comprises a metal material that again has different properties, for instance such that in a locally restricted way it can carburize or be nitrided, in order to be able to subject especially critical places in this way to case hardening or nitriding—without thereby adversely affecting the tool properties of the induction portion, for instance.

FIGS. 32 through 35 show a further exemplary embodiment of the invention.

In this exemplary embodiment, the tool holder is embodied as a collet chuck. It therefore comprises a main body 2 with a retaining flange 6. The retaining flange 6 is adjoined here by an attachment portion 8 of the main body 2. The attachment portion merges with a clamping portion 3, which is formed by a tube part. The tube part has a tool receptacle 4, which intermittently forms a conical seat 28 into which the actual collet 30, forming a further component of the tool holder, can be press-fitted with the aid of a cap nut 29 forming a further component of the tool receptacle. This press-fitting is done in a manner known per se such that as soon as the collet has been driven into its conical seat, the arms of the collet close in the radially inward direction and between them clamp the tool shaft by frictional engagement.

Figure 32:
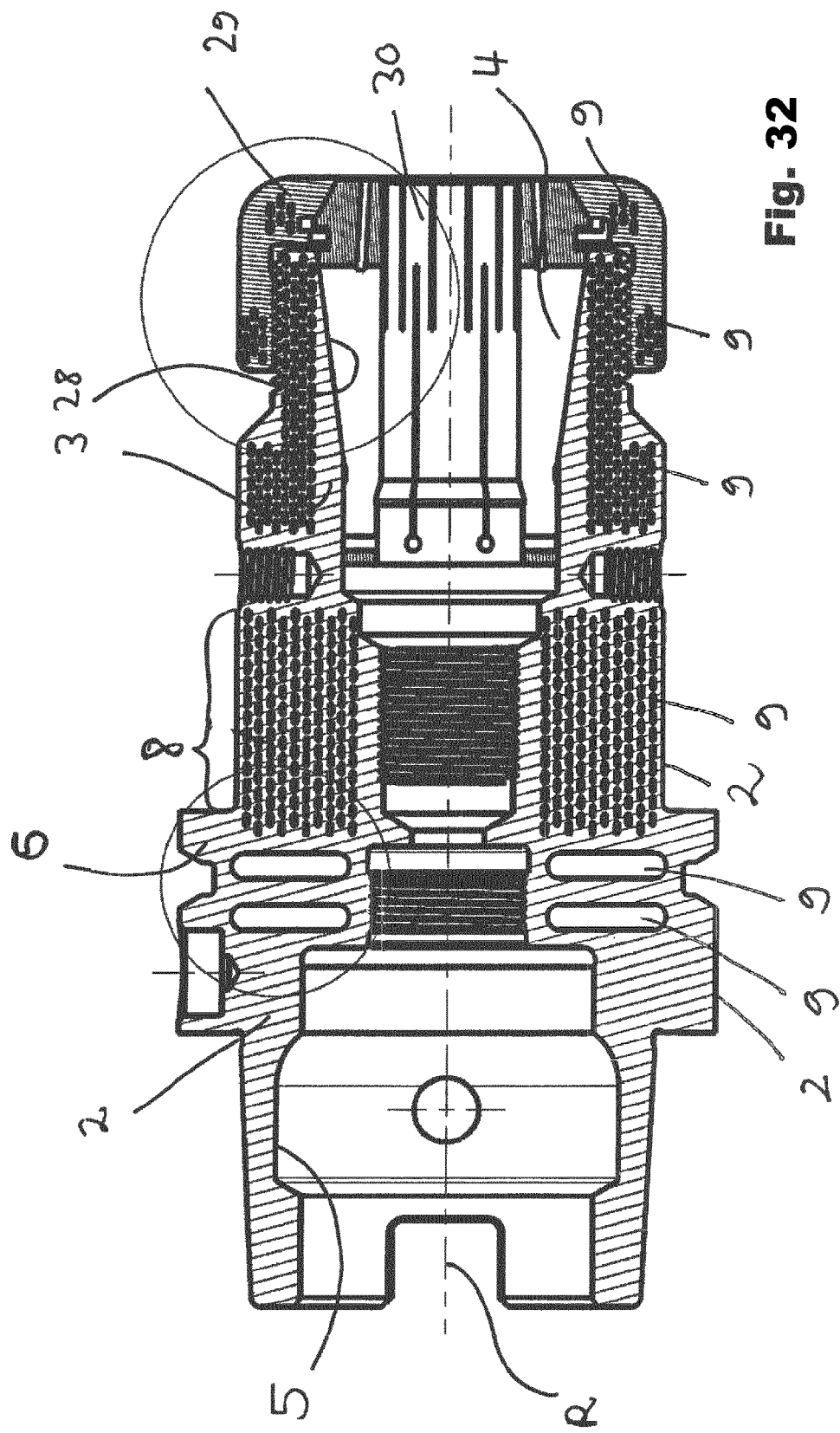
FIG. 32 shows a fourteenth exemplary embodiment in a section along the axis of rotation R.
Figure 35:
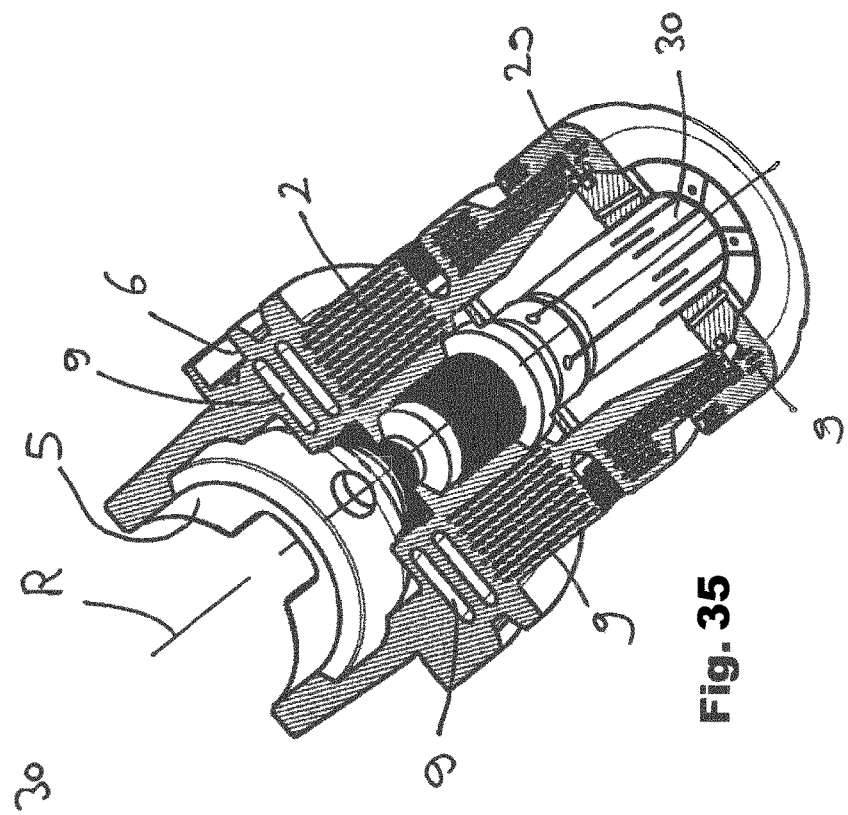
FIG. 35 shows a perspective view that corresponds to FIG. 32.
Figure 33:
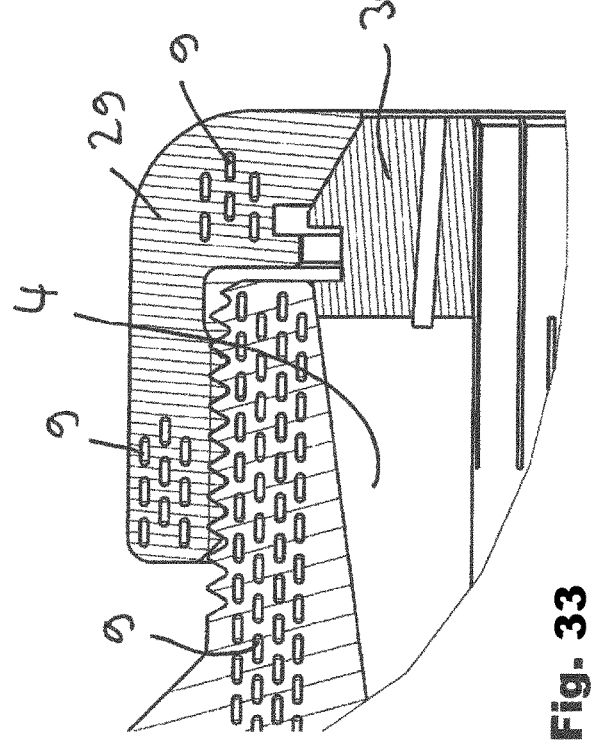
FIG. 33 shows an enlarged cutout of the area of the tube part and the cap nut, which is marked in FIG. 32 by a circle.
Figure 34:
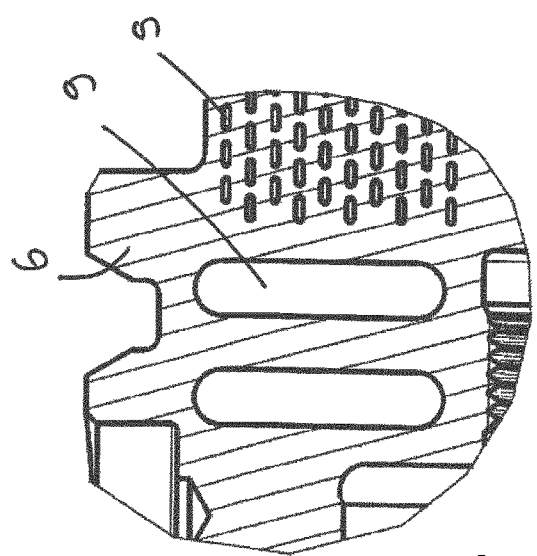
FIG. 34 shows an enlarged cutout of the area below the retaining flange of the handling system, which is marked in FIG. 32 by a circle.
Figure 40:
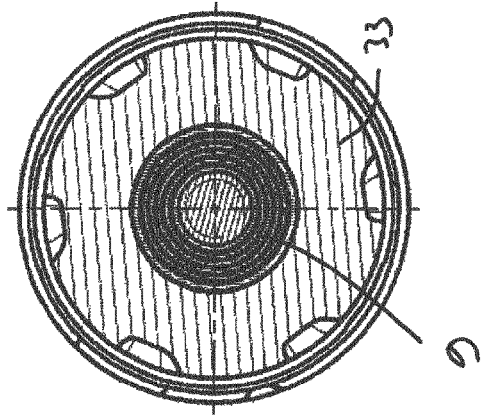
FIG. 40 shows a section perpendicular to the axis of rotation through the cutter head and the clamping portion on which the cutter head is seated.

In this embodiment, both the main body 2 and the clamping portion 3 and (optionally) the cap nut 29 belonging to the tool holder preferably have cavities in the sense of the invention—in the manner shown for instance in FIG. 32. If necessary, also (or even only) the collet is equipped with cavities of the invention, which then are embodied such that all of them, or at least the great majority, also form enclaves in the arms of the collet.

For all these cavities, what is said for the previous exemplary embodiments accordingly. For instance, the cavities in the embodiment shown in FIG. 32 are designed as described for the cavities that the second exemplary embodiment of FIGS. 3 through 5 has. Alternatively, however, the cavities can also be embodied as described in conjunction with the first exemplary embodiment of FIG. 1, or as described in conjunction with one of the other exemplary embodiments.

A special aspect in this exemplary embodiment is that in addition to the tube part embodying the clamping portion 3, preferably the main body also is equipped with ideally two kinds of cavities—namely (so-called "pore forming") cavities that are preferably likewise embodied as described in conjunction with one of the exemplary embodiments described above and especially expediently are embodied with additional cavities, which are larger and designed as described in conjunction with FIGS. 22a through 25b.

The cavities provided in the tube part that forms the damping portion 3 extend, viewed in the direction of the axis of rotation, preferably over the entire length of the rube part and are ideally also provided in the vicinity radially below the thread for tightening the cap nut 29. Here as well, the cavities ensure improved damping, as described above.

Moreover, here again, the cavities are preferably provided in such a large number (in the vicinity of the portion between the main body 2 and the tube part 3, for instance, at least 8 layers and in the drawing even 10 layers of cavities are provided in the radial direction, located on imaginary circular cylinders located coaxially one inside the other) that for this tool holder as well, the result is a weight reduction that improves handling, for instance on the order of at least 10% better and even at least 20% better in comparison to a corresponding tool holder that comprises solid material throughout.

As already touched on, the cap nut 29 can also be provided with cavities of the variant embodiments already extensively described; these too are embodied as enclaves. It is expedient to provide them with cavities also (or only) on the portion that on its inner circumference forms the thread of the cap nut, which thread interacts with the counterpart thread on the tool holder. In this way, the cap nut, becomes "softer" in the radial direction without perceptibly losing clamping force in the direction of the axis of rotation. Thus it does not act as a "stiff" belt that, where it forms the cone on its inside, nonresiliently embraces the tube part and thereby excessively hinders the microscopic motions of the tube part that are important for the damping and are intentionally enabled by the cavities in the clamping portion 3.

For the same reason, it can be expedient to equip the cap nut also (or, less preferably, only) with cavities of the invention where the portion of the cap nut 29 extending substantially in the direction of the longitudinal axis merges with the radially extending portion of the cap nut with which the cap nut acts directly on the collet; see FIG. 32.

Then it can be expedient for the collet 30 in turn to be equipped with cavities that form enclaves and that can be designed in accordance with the variants that have already been described above. If such cavities are located in the arms of the collet that are separated from one another by slits, then naturally in the circumferential direction they do not extend "through" but rather only so far in the circumferential direction as the applicable arm, so that they form an enclave within that arm.

In conclusion, a final exemplary embodiment is shown in FIGS. 36 through 40.

In this exemplary embodiment, the tool holder is embodied as a cutter head receptacle; in the drawings, tool receptacles that are for example equipped with a cutter head 33 are shown.

Therefore the tool holder comprises a main body 2 with a retaining flange 6. The retaining flange 6 is adjoined here also by an attachment portion 8 of the main body 2. This attachment portion merges with the clamping portion 3, which is formed here by a tube part that on its outer circumference forms a tool receptacle for a cutter head 33. The interior of the tube part here has a female thread, into which the retaining screw 31 can be screwed, which fixes the cutter head 33 in the direction parallel to its axis of rotation. As best seen from FIGS. 38 and 39, the main body 2 is additionally provided with positive-engagement elements 32, here embodied as bolts press-fitted into the main body, which have appropriate fitting faces and action faces, by way of which bolts the cutter head 33 is slaved in the circumferential direction.

Figure 39:
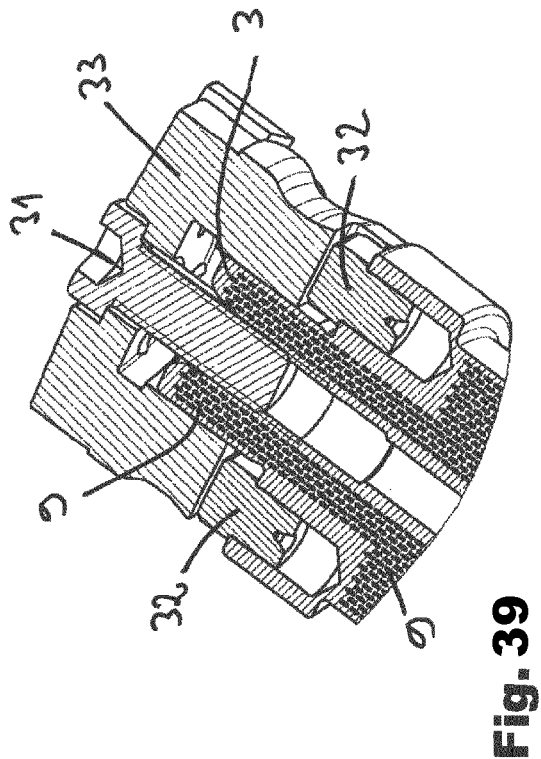
FIG. 39 shows an enlarged view of the area that is marked with a circle in FIG. 38.

In this embodiment as well, the clamping portion 3 has cavities in the sense of the invention—in the way shown very clearly for instance in FIG. 39. Preferably, the main body 2 also, or even only the main body 2, has cavities.

Figure 38:
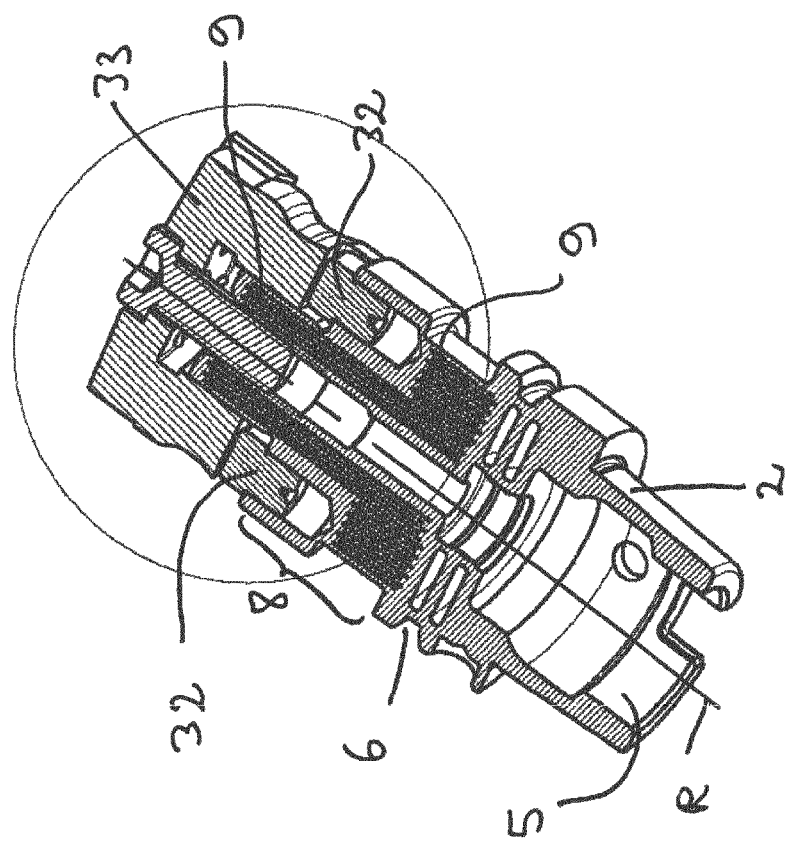
FIG. 38 shows a perspective view, which corresponds to FIG. 36.

For all these cavities, what is said for the previous exemplary embodiments applies accordingly. The cavities, for instance in the embodiment shown in FIG. 38, are designed as described for the cavities that the exemplary embodiment of FIGS. 3 through 5 has. Alternatively, the cavities can, however, also be embodied as has been described for the first exemplary embodiment of FIG. 1, or as described for one of the other exemplary embodiments.

A special aspect in this exemplary embodiment is that in addition to the tube part that forms the clamping portion 3, preferably the main body also is equipped with ideally two types of cavities, as has ahead been described for the immediately preceding exemplary embodiment.

The cavities provided in the tube part forming the clamping portion 3 extend, viewed in the direction of the axis of rotation, preferably over the entire length of the clamping portion. Here as well, the cavities ensure improved damping, as described above.

In addition it should be noted that for this kind of tool holder in the form of a cutter bead receptacle, it can be especially favorable if the attachment portion 8 of the main body, which portion is located between the retaining flange 6 and the clamping portion 3, is equipped with a high number of cavities (at least 25 and even better, at least 50), so that this region predominantly has a porous structure which contributes to a particular degree to the damping.

In general it should be said that the cavities are preferably provided in such a large number (in the vicinity of the portion between the main body 2 and the tube part 3, for instance, at least 8 layers and in the drawing even 10 layers of cavities are provided in the radial direction, located on imaginary circular cylinders located coaxially one inside the other) that for this tool holder as well, the result is a weight reduction that improves handling, for instance on the order of at least 10% better and even at least 20% better in comparison to a corresponding tool holder that comprises solid material throughout.

Following the exemplary embodiments, it should be said quite generally that independently of and in addition to the claims presented thus far, protection is also claimed for collets per se that are equipped with the cavities of the invention. Expediently, these collets are designed, as described above and not least also by the drawings, which show the claimed collet in its intended environment. The cavities are advantageously embodied as described above for the tool holders.

Following the description of the individual exemplary embodiments, it should also be stated quite generally that in addition to and independently of the claims presented thus far, independent patent protection is also sought for a cap nut, which is equipped with an action face for driving a collet into its conical seat and is provided with a plurality of cavities, which each form an enclave in the cap nut, the cavities advantageously being embodied as described above for the tool holders.

In closing, it is noted quite generally that protection is also sought for a tool holder and method for producing such a tool holder, which have the features that are recited in one or more of the ensuing paragraphs.

This protection is claimed in each case in the sense that the features may be present in addition to the features that are specified by one or more of the appended claims. However, this protection is also claimed in the sense that whenever "preferably of one of the claims" and/or "method", this is a set of features that at an appropriate time is sought as a basis for a further main claim, which is independent of the features of the main claim pursued thus far.

When "foregoing paragraphs" are referred to, this is a reference to the paragraphs following this sentence.

A tool holder (1) for chucking of a tool shaft by frictional engagement, having a main body (2) for coupling the tool holder (1) to the spindle of a machine tool and having a clamping surface (3), joined to it, or a tube part (3) joined to it, for fixation of a tool shaft by frictional engagement, characterized in that the tool holder (1) has at least one portion shaped in one piece by primary shaping, in which an outer connecting channel (20) is embodied that extends into the interior of the portion and, there widens, forming at least one cavity (9).

The tool holder (1) of claim 17, characterized in that the at least one cavity is filled with a fluid, and a pressure producer, preferably to be actuated from outside, is built into the at least one outer connecting channel (20), by means of which producer the fluid can be subjected to pressure.

The tool holder (1) of the foregoing paragraph and/or of one the existing claims, characterized in that that the cavities (9) form a three-dimensional set of cavities, which is distinguished in that progressively in the radial direction from the inside outward, a plurality of cavities (9) are located one after another, preferably in alignment with one another, and at the same time a plurality of cavities are located one after another in the direction of the axis of rotation (R), and preferably in alignment with one another.

The tool holder (1) of at least one of the foregoing, paragraphs and/or one of the existing claims, characterized in that at least 10, and even better at least 20, cavities (9) are present, which are preferably all located in the interior of the one-piece clamping surface or of the one-piece tube part (3), which communicate with one another via inner connecting channels and which communicate via at least one outer connecting channel (20) with a pressure producer that specifies the pressure of the fluid with which the cavities (9) are filled.

The tool holder (1) preferably of at least one of the foregoing paragraphs and/or preferably one of the existing claims, characterized in that the tool holder (1) has at least one coolant supply line (11), which is machined into a region of the tool holder (1) comprising a metal layer material and extends into the main body (2) from the face end of the tool holder (1) toward the tool to be chucked and preferably discharges into the inner chamber bounded thereby, and the coolant supply line (11) changes its directional course extension at least one location, without having a side arm that is formed by a bore that has been made from the outer surface of the tool holder (1) into the tool holder (1).

The tool holder (1) of at least one of the foregoing paragraphs and/or one of the existing claims, characterized in that the coolant supply line (11) has at least one portion that extends substantially in the radial direction.

The tool holder (1) preferably of at least one of the foregoing paragraphs and/or preferably of one of the existing claims, characterized in that the tool holder (1) in its interior has at least one positive-engagement element, which is an integral component of a region of the tool holder (1) comprising a metal layer material, and which positive-engagement element is designed such that by positive-engagement interaction with the tool shaft that is firmly retained substantially by positive engagement by the tool holder (1), it prevents the tool shaft from being unintentionally pulled out from the tool receptacle in the direction along the axis of rotation (R).

The tool holder (1) preferably of one of the foregoing claims, characterized in that the tool holder (1) has at least one coolant damming chamber (22), which is bounded among other things by a damming disk (23), which is an integral component of a region of the tool holder (1) comprising a metal layer material, and the damming disk (23), viewed in the direction along the axis of rotation (R), preferably covers at least one mouth site of at least one coolant supply line (11).

The tool holder (1) preferably of one of the foregoing claims, having a main body (2) for coupling the tool holder (1) to the spindle of a machine tool and a clamping surface (3), joined to it, for fixation and preferably shrinking in of a tool shaft, in which a first portion of the tool holder (1) comprises forged or cast metal, characterized in that a second portion of the tool holder (1) comprises a metal layer material, and the first portion is preferably the main body (2) of the tool holder (1), and the second portion is preferably the clamping surface (3) of the tool holder (1), or vice versa.

A method for producing a tool holder (1) having a main body (2) for coupling the tool holder (1) to the spindle of a machine tool and having a clamping surface (3), joined to it, for fixation and in particular for shrinking in of a tool shaft, in which a first portion, preferably the main body (2), is produced as a rotary part from the solid or from a pre-forged or precast blank, preferably of tool steel, characterized in that a second portion, preferably the clamping surface (3), which is ideally embodied as a tube part, is constructed of individual metal layers that are generated successively on one another, until the clamping surface (3) has a predetermined shape.

The method of claim 26, characterized in that the metal films forming the first portion are melted from a mixture of different or differently alloyed metals.

The method of one of claim 26 or 27, characterized in that the composition of the metal films is locally varied more than merely insubstantially, such that the metal films locally have special mechanical and/or electrical and/or magnetic properties.

The method of one of claims 26 through 28, characterized in that the method is carried out for producing the tool holder (1) in such a way that the clamping surface (3), embodied in the form of a tube part, has an outer portion forming the outer circumference of the tube part, which outer portion comprises a metal material in which heat can be generated inductively under the influence of a magnetic alternating field, and which outer portion also has an inner portion, joined to it and made of the same material and forming the tool receptacle, and the inner portion comprises a metal material that heats up less intensely, under the influence of an alternating field, than the material of the outer portion and at the same time has a higher thermal expansion than the material of the outer portion.

The method of one of claims 26 through 29, characterized in that the second portion, after the conclusion of the generation of the individual layers, is subjected to a preferably microstructure-changing heat treatment.

The method of one of claims 26 through 30, characterized in that the first portion of the tool holder (1), which comprises forged or cast metal, is used as a substrate, onto which the second portion of the tool holder), which comprises a metal layer material, is gradually applied.

The method of one of claims 26 through 30, characterized in that the second, portion or the tube part (3) s joined to the main body (2) and in particular welded only after the conclusion of the heat treatment.

The method of one of claims 26 through 32, characterized in that the second portion or the rube part (3), after the conclusion of the generation of the individual layers and preferably after the ensuing heat treatment, is subjected to a rotary machining and/or external and/or internal circular grinding, and the aforementioned machining ideally takes place only after the joining of the main body to the tube part.

The method of one of claims 26 through 33, characterized in that the tool receptacle, after the conclusion of the generation of the individual layers and preferably after the ensuing heat treatment, is subjected to a reaming and/or grinding machining.

A tool holder (1) having a main body (2) for coupling the tool holder (1) to the spindle of a machine tool and having a tube part (3) joined to it for thermal or hydraulic chucking of a tool shaft, characterized in that the outer circumference of the tube part (3) has an induction portion, which comprises a metal that is electrically and magnetically conductive, and the portion located inside the induction portion of the tube part (3) comprises a metal which has a higher coefficient of thermal expansion than the metal comprising the induction portion, and the induction portion and the portion of the tube part (3) located inside the induction portion are both an integral, one-piece component circumferential of the tube part (3).

The tool holder of one of the foregoing claims, characterized in that the portion shaped in one piece by primary shaping comprises solely metal layers, zones or, points, entirely without other components or at least without other components that extend beyond the category of contaminants.

The tool holder of one of the foregoing claims, characterized in that the portion shaped in one piece by primary shaping entirely or partially comprises at least one alloy, and in particular a shape memory alloy.

The tool holder of one of claims 1 through 35, characterized in that the portion shaped in one piece by primary shaping is produced from at least one metal starting material or a metal powder, which includes components of at least one nonmetal material that affect the tool properties.

What is claimed is:

1. A tool holder for chucking a tool shaft by frictional engagement, comprising:
    a main body for coupling the tool holder to a spindle of a machine tool;
    a clamping surface joined to the main body, or a tube part joined to the main body, for fixation of a tool shaft by frictional engagement; and
    at least one portion of the clamping surface or tube part is shaped in one piece by primary shaping, in which an outer connecting channel extends into an interior of the portion and there, on a side of the clamping surface or tube part facing away from a mouth of the tool holder, widens, forming a plurality of interconnected ring-like cavities that are each circumferential around a tool shaft with a first ring-like cavity connected directly to the outer connecting channel and connected to at least one second ring-like cavity positioned in a direction toward an opening of the mouth of the tool holder, wherein the first ring-like cavity and each of the at least one second ring-like cavities are connected to one another via an inner connecting channel having a smaller inside cross-section than an inside cross-section of the first ring-like cavity and each of the at least one second ring-like cavities, and wherein the plurality of interconnected cavities are substantially closed on all sides with the exception of the inner connecting channels, and are spatially distributed and located entirely in the interior of the portion shaped in one piece by primary shaping, and wherein the inner connecting channels are not circumferential around the tool shaft,
    wherein the plurality of interconnected ring-like cavities are tight on their own even at extremely high internal pressures since the plurality of interconnected ring-like cavities are embodied entirely inside the one-piece portion, and
    wherein the plurality of interconnected ring-like cavities are filled with a fluid, and a pressure producer, actuated from outside, is built into the outer connecting channel, and the fluid can be subjected to pressure by the producer.

2. The tool holder of claim 1, wherein the plurality of interconnected ring-like cavities form a three-dimensional set of interconnected ring-like cavities, which is distinguished in that progressively in a radial direction from an inside outward, the plurality of interconnected ring-like cavities are located one after another, in alignment with one another, and at the same time, in a direction of an axis of rotation, the plurality of interconnected ring-like cavities are located one after another, and in alignment with one another.

3. The tool holder of claim 1, the plurality of interconnected ring-like cavities including at least 10 interconnected ring-like cavities, which are all located in an interior of the one-piece clamping surface or of the one-piece tube part, which interconnected ring-like cavities communicate with one another via inner connecting channels and which interconnected ring-like cavities communicate via at least one outer connecting channel, including the outer connecting channel, with a pressure producer that specifies the pressure of the fluid with which the interconnected ring-like cavities are filled.

4. The tool holder of claim 1, wherein the tool holder has at least one coolant supply line, which is machined into a region of the tool holder comprising a metal layer material and extends into the main body from a face end of the tool holder toward the tool to be chucked, and discharges into an inner chamber bounded thereby, and the at least one coolant supply line changes its directional course extension in at least one location, without having a side arm that is formed by a bore that has been made from an outer surface of the tool holder into the tool holder.

5. The tool holder of claim 4, wherein the at least one coolant supply line has at least one portion that extends substantially in a radial direction.

6. The tool holder of claim 1, wherein the tool holder in its interior has at least one positive-engagement element, which is an integral component of a region of the tool holder comprising a metal layer material, and which positive-engagement element is designed such that by positive-engagement interaction with the tool shaft that is firmly retained substantially by positive engagement by the tool holder, the positive-engagement element prevents the tool shaft from being unintentionally pulled out from the tool holder in a direction along an axis of rotation.

7. The tool holder of claim 1, wherein the tool holder has at least one coolant damming chamber, which is bounded among other things by a storage disk, which is an integral component of a region of the tool holder comprising a metal layer material, and the storage disk, viewed in a direction along an axis of rotation, covers at least one mouth of at least one coolant supply line.

8. The tool holder of claim 1, wherein a first portion of the tool holder comprises forged or cast metal, and a second portion of the tool holder comprises a metal layer material, and the first portion is the main body of the tool holder, and the second portion is the clamping surface of the tool holder.

9. A method for producing the tool holder of claim 1, the method comprising:
producing a first portion, comprising the main body, as a rotary part from a solid or from a pre-forged or precast blank, of tool steel; and
constructing a second portion, comprising the clamping surface, which is embodied as a tube part, of individual metal layers that are generated successively on one another, until the clamping surface has a predetermined shape.

10. The method of claim 9, comprising melting metal films from a mixture of different or differently alloyed metals to form the first portion.

11. The method of claim 10, wherein a composition of the metal films is locally varied more than merely insubstantially, such that the metal films locally have special mechanical and/or electrical and/or magnetic properties.

12. The method of claim 9, comprising carrying out the method in such a way that the clamping surface, embodied in the form of a tube part, has an outer portion forming an outer circumference of the tube part, which outer portion comprises a metal material in which heat can be generated inductively under an influence of a magnetic alternating field, and which outer portion also has an inner portion, joined to the outer portion and made of the same material and forming the tool holder, and the inner portion comprises a metal material that heats up less intensely, under an influence of an alternating field, than the material of the outer portion and at the same time has a higher thermal expansion than the material of the outer portion.

13. The method of claim 9, comprising, after generating the individual layers of the second portion, subjecting the second portion to a microstructure-changing heat treatment.

14. The method of claim 13, comprising welding the second portion or the tube part to the main body only after a conclusion of the heat treatment.

15. The method of claim 13, comprising, after the conclusion of the generation of the individual layers and after the ensuing heat treatment, subjecting the tool holder to a reaming and/or grinding machining.

16. The method of claim 9, comprising using the first portion of the tool holder, which comprises forged or cast metal, as a substrate, and gradually applying the second portion of the tool holder, which comprises a metal layer material, onto the first portion of the tool holder.

17. The method of claim 9, comprising, after the conclusion of the generation of the individual layers and after a microstructure-changing heat treatment of the second portion, subjecting the second portion or the tube part to a rotary machining and/or external and/or internal circular grinding, wherein the aforementioned machining takes place only after joining the main body to the tube part.

18. The tool holder of claim 1, wherein the fluid flows through the outer connecting channel into the first ring-like cavity without flowing in a countercurrent direction relative to the fluid flow to the first ring-like cavity.

* * * * *